US006953630B2

(12) United States Patent  
Wells

(10) Patent No.: US 6,953,630 B2  
(45) Date of Patent: Oct. 11, 2005

(54) FUEL CELL ANOMALY DETECTION METHOD AND APPARATUS

(75) Inventor: Brian Wells, Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 503 days.

(21) Appl. No.: 09/916,115

(22) Filed: Jul. 25, 2001

(65) Prior Publication Data

US 2003/0022040 A1 Jan. 30, 2003

(51) Int. Cl.[7] .............................. H01M 8/04; H01M 8/24
(52) U.S. Cl. .............................. 429/13; 429/23; 429/32
(58) Field of Search ............................ 429/13, 23, 32; 340/636.15, 660–663

(56) References Cited

U.S. PATENT DOCUMENTS

| 2,988,656 | A | 6/1961 | Grobel ........................ 310/53 |
| 3,061,658 | A | 10/1962 | Blackmer ..................... 136/86 |
| 3,317,348 | A | 5/1967 | Winsel ........................ 136/86 |
| 3,383,580 | A | 5/1968 | Wallace, Jr. .................. 320/48 |
| 3,452,347 | A | 6/1969 | Stimson ....................... 340/249 |
| 3,553,026 | A | 1/1971 | Winsel ........................ 136/86 |
| 3,580,741 | A | 5/1971 | Hovious et al. ............... 136/86 |
| 3,600,234 | A | 8/1971 | Massie, Jr. .................... 136/182 |
| 3,615,842 | A | 10/1971 | Craft et al. ................... 136/86 |
| 3,666,562 | A | 5/1972 | Sprengel ...................... 136/86 |
| 3,697,325 | A | 10/1972 | Baude ......................... 136/86 |
| 3,775,282 | A | 11/1973 | Craft et al. ................... 204/266 |
| 3,808,534 | A | 4/1974 | Summers et al. ............... 340/249 |
| 3,850,696 | A | 11/1974 | Summers et al. ............... 136/86 |
| 3,891,465 | A | 6/1975 | Muto et al. .................... 136/182 |
| 3,935,028 | A | 1/1976 | Strasser et al. ................ 429/14 |
| 3,949,545 | A | 4/1976 | Chihara .................... 58/23 BA |
| 3,969,697 | A | 7/1976 | Iwasa et al. ................ 340/248 B |
| 3,996,579 | A | 12/1976 | Dahl .......................... 340/249 |
| 4,037,024 | A | 7/1977 | Landau ........................ 429/17 |
| 4,078,893 | A | 3/1978 | Gilman et al. ................ 23/253 |
| 4,085,255 | A | 4/1978 | Grave et al. .................. 429/26 |
| 4,197,675 | A | 4/1980 | Kelly ............................ 49/31 |
| 4,243,731 | A | 1/1981 | Cheron ........................ 429/13 |
| 4,310,606 | A | 1/1982 | Maida .......................... 429/93 |
| 4,424,491 | A | 1/1984 | Bobbett et al. ............... 324/433 |
| 4,729,931 | A | 3/1988 | Grimble ...................... 429/17 |
| 4,816,768 | A | 3/1989 | Champlin .................... 324/428 |
| 4,826,741 | A | 5/1989 | Aldhart et al. ................ 429/19 |
| 4,829,290 | A | 5/1989 | Ford .......................... 340/663 |
| 5,074,137 | A | 12/1991 | Harris et al. ................ 73/31.02 |
| 5,132,663 | A | 7/1992 | Strobl et al. ................. 340/438 |
| 5,139,894 | A | 8/1992 | Mizuno et al. ................ 429/9 |
| 5,199,396 | A | 4/1993 | Shelef et al. ............. 123/198 D |
| 5,392,873 | A | 2/1995 | Masuyama et al. ......... 180/68.5 |
| 5,397,655 | A | 3/1995 | Bette et al. .................... 429/13 |

(Continued)

FOREIGN PATENT DOCUMENTS

| EP | 136 187 A2 | 4/1985 |
| EP | 0 917 225 A1 | 5/1999 |

(Continued)

OTHER PUBLICATIONS

"Semiconductor Device," Encyclopedia Britannica [online] [retrieved on Feb. 4, 2004]. Retrieved from the Internet:<URL: http://www.search.eb.com/eb/article?eu=108510>.*

(Continued)

*Primary Examiner*—Jonathan Crepeau  
(74) *Attorney, Agent, or Firm*—Kerry Hillier; Seed IP Law Group PLLC

(57) ABSTRACT

A respective bipolar junction transistor is coupled across pairs of fuel cells in a fuel cell stack to monitor the voltage across each fuel cell pairs for a drop in voltage below a threshold voltage. A respective optoisolator coupled to each of the transistors produces a digital signal corresponding to the status of the respective pair of fuel cells. An "AND" circuit produces a single digital signal corresponding to the status of one or more pairs of fuel cells.

32 Claims, 18 Drawing Sheets

U.S. PATENT DOCUMENTS

| | | | |
|---|---|---|---|
| 5,478,662 A | 12/1995 | Strasser | 429/13 |
| 5,482,790 A | 1/1996 | Yamada et al. | 429/9 |
| 5,503,944 A | 4/1996 | Meyer et al. | 429/13 |
| 5,631,532 A | 5/1997 | Azuma et al. | 320/5 |
| 5,763,113 A | 6/1998 | Meltser et al. | 429/13 |
| 5,869,952 A | 2/1999 | Fisher et al. | 320/136 |
| 5,939,218 A | 8/1999 | Mizuno | 429/23 |
| 5,945,229 A | 8/1999 | Meltser | 429/13 |
| 6,028,414 A | 2/2000 | Chouinard et al. | 320/110 |
| 6,048,473 A | 4/2000 | Denda et al. | 252/376 |
| 6,066,408 A * | 5/2000 | Vitale et al. | 429/26 |
| 6,093,500 A | 7/2000 | Margiott et al. | 429/13 |
| 6,093,502 A | 7/2000 | Carlstrom, Jr. et al. | 429/25 |
| 6,124,054 A | 9/2000 | Gorman et al. | 429/34 |
| 6,140,820 A | 10/2000 | James | 324/434 |
| 6,159,626 A | 12/2000 | Keskula et al. | 429/22 |
| 6,162,556 A | 12/2000 | Vollmar et al. | 429/17 |
| 6,171,718 B1 | 1/2001 | Murach et al. | 429/13 |
| 6,242,120 B1 | 6/2001 | Herron | 429/22 |
| 6,290,594 B1 | 9/2001 | Osborne | 454/75 |
| 6,387,556 B1 | 5/2002 | Fuglevand et al. | 429/22 |
| 6,423,434 B1 | 7/2002 | Pratt et al. | 429/13 |
| 6,426,158 B1 | 7/2002 | Pratt et al. | 429/13 |
| 6,455,181 B1 | 9/2002 | Hallum | 429/13 |
| 6,461,751 B1 | 10/2002 | Boehm et al. | 429/13 |
| 6,492,043 B1 | 12/2002 | Knights et al. | 429/13 |
| 6,497,971 B1 | 12/2002 | Reiser | 429/13 |
| 6,519,510 B1 | 2/2003 | Margiott et al. | 700/299 |
| 6,558,826 B1 | 5/2003 | Walsh | 429/17 |
| 6,569,549 B1 | 5/2003 | Sawyer | 429/13 |
| 6,677,066 B1 * | 1/2004 | Jansen et al. | 429/7 |
| 2001/0014415 A1 | 8/2001 | Iio et al. | 429/22 |
| 2001/0018142 A1 | 8/2001 | Kato et al. | 429/22 |
| 2002/0076583 A1 | 6/2002 | Reiser et al. | 429/13 |
| 2002/0094467 A1 | 7/2002 | Nonobe et al. | 429/34 |
| 2002/0094468 A1 | 7/2002 | Muira et al. | 429/34 |
| 2002/0094469 A1 | 7/2002 | Yoshizumi et al. | 429/34 |
| 2003/0003333 A1 | 1/2003 | Haridos | 429/22 |
| 2003/0022031 A1 | 1/2003 | Manery | |
| 2003/0022036 A1 | 1/2003 | Parr | |
| 2003/0022037 A1 | 1/2003 | Parr et al. | |
| 2003/0022038 A1 | 1/2003 | Vaal et al. | |
| 2003/0022041 A1 | 1/2003 | Barton et al. | |
| 2003/0022042 A1 | 1/2003 | Wells et al. | |
| 2003/0022045 A1 | 1/2003 | Wells et al. | |
| 2003/0022050 A1 | 1/2003 | Barton et al. | |

FOREIGN PATENT DOCUMENTS

| | | |
|---|---|---|
| EP | 982 788 A2 | 3/2000 |
| EP | 1 018 744 A2 | 7/2000 |
| EP | 1 037 041 A2 | 9/2000 |
| EP | 1 091 436 A1 | 12/2000 |
| EP | 1 091 437 A1 | 4/2001 |
| EP | 1 111 703 A2 | 6/2001 |
| EP | 1 187 241 A2 | 3/2002 |
| GB | 1223941 | 3/1971 |
| GB | 1396157 | 6/1975 |
| JP | 60-158557 | 8/1985 |
| JP | 63-029460 | 2/1988 |
| JP | 64-089155 | 4/1989 |
| JP | 6-243886 | 9/1994 |
| JP | 07-169481 | 7/1995 |
| JP | 08-088014 | 4/1996 |
| JP | 8-250139 | 9/1996 |
| WO | WO 91/19328 | 12/1991 |
| WO | WO 94/09519 | 4/1994 |
| WO | WO 99/28985 | 6/1999 |
| WO | WO 00/02282 | 1/2000 |
| WO | WO 00/74162 A1 | 12/2000 |
| WO | WO 01/26173 A1 | 4/2001 |
| WO | WO 01/26174 A1 | 4/2001 |
| WO | WO 01/43216 A2 | 6/2001 |
| WO | WO 02/23658 A1 | 3/2002 |

OTHER PUBLICATIONS

Abstract of EP 1018774 A1, *esp@cenet* database, Jul. 12, 2000.

Abstract of JP 2–078159, *esp@cenet* database, Mar. 19, 1990.

Abstract of JP 4–115467, *esp@cenet* database, Apr. 16, 1992.

Abstract of JP 4–220955, *esp@cenet* database, Apr. 11, 1992.

Abstract of JP 6–084536, *esp@cenet* database, Mar. 25, 1994.

Abstract of JP 7–325075, *esp@cenet* database, Dec. 12, 1995.

Abstract of JP 8–162138, *esp@cenet* database, Jun. 26, 1996.

Abstract of JP 8–185879, *esp@cenet* database, Jul. 16, 1996.

Abstract of JP 60–212966, *esp@cenet* database, Oct. 25, 1985.

Abstract of JP 63–241876, *esp@cenet* database, Oct. 7, 1988.

Abstract of JP 2000–009685, *esp@cenet* database, Jan. 14, 2000.

* cited by examiner

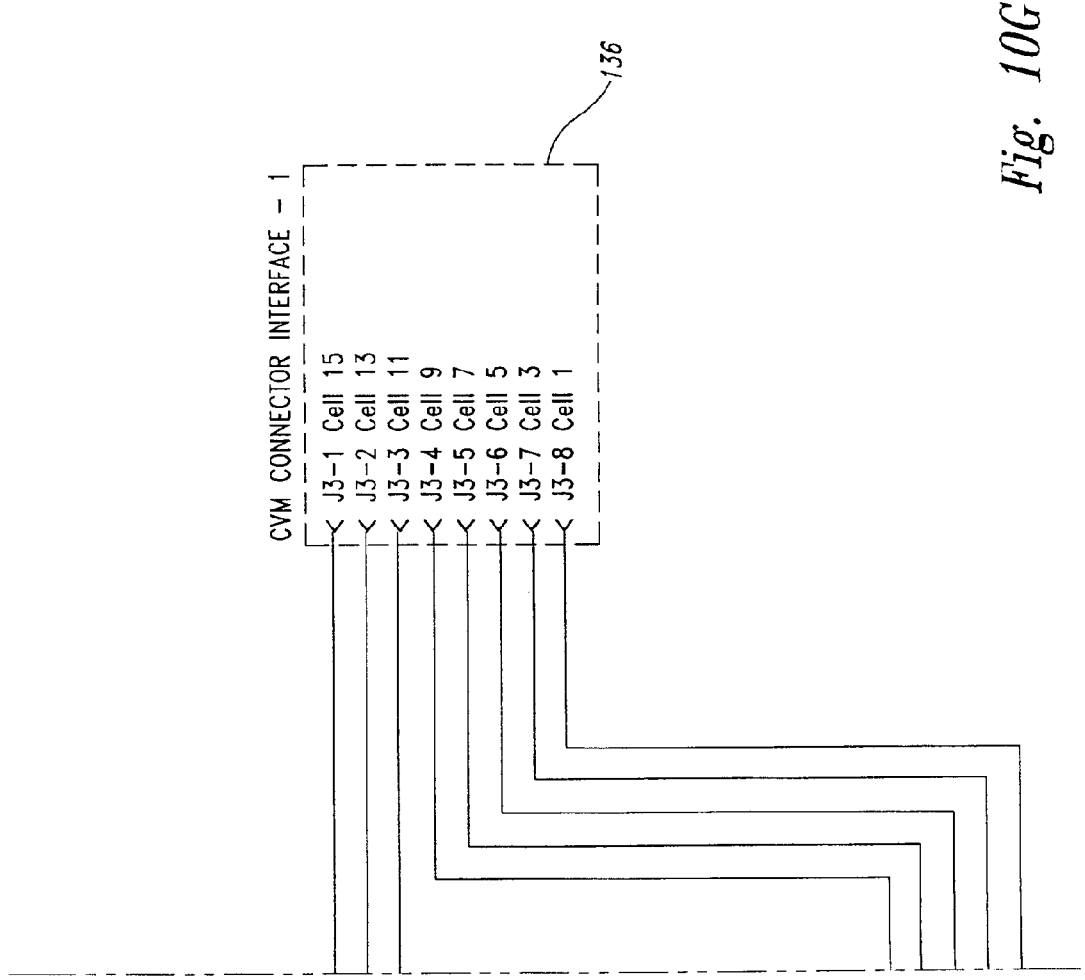

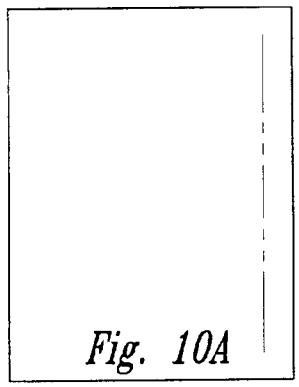
Fig. 10A
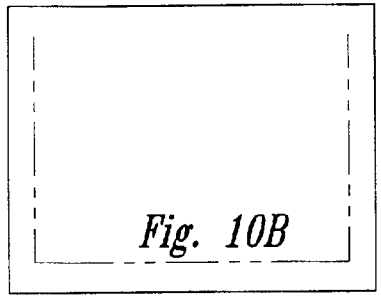
Fig. 10B
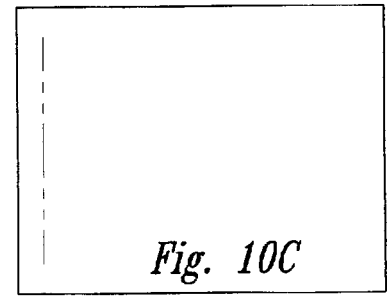
Fig. 10C
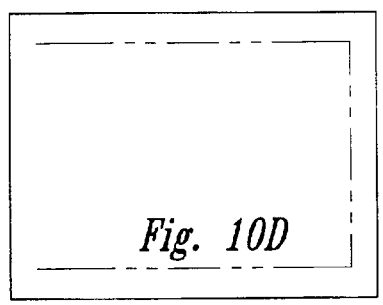
Fig. 10D
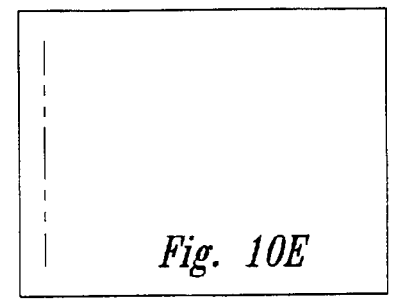
Fig. 10E
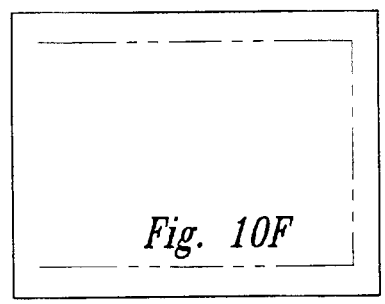
Fig. 10F
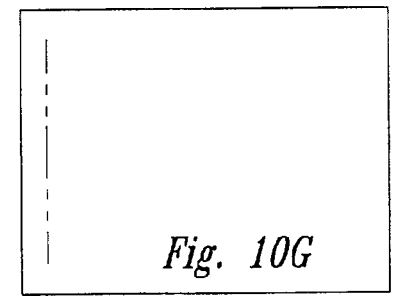
Fig. 10G
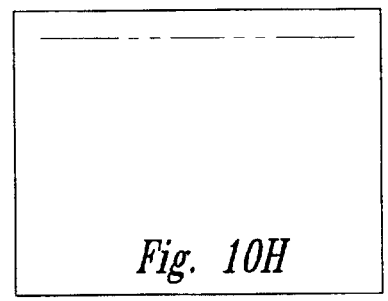
Fig. 10H
Fig. 12

FUEL CELL ANOMALY DETECTION METHOD AND APPARATUS

BACKGROUND OF THE INVENTION

1. Technical Field

The present invention relates to fuel cells, and particularly to control systems for fuel cells.

2. Description of the Related Art

Electrochemical fuel cells convert fuel and oxidant to electricity. Solid polymer electrochemical fuel cells generally employ a membrane electrode assembly ("MEA") which comprises an ion exchange membrane or solid polymer electrolyte disposed between two electrodes typically comprising a layer of porous, electrically conductive sheet material, such as carbon fiber paper or carbon cloth. The MEA contains a layer of catalyst, typically in the form of finely comminuted platinum, at each membrane/electrode interface to induce the desired electrochemical reaction. In operation the electrodes are electrically coupled to provide a circuit for conducting electrons between the electrodes through an external circuit. Typically, a number of MEAs are serially coupled electrically to form a fuel cell stack having a desired power output.

In typical fuel cells, the MEA is disposed between two electrically conductive fluid flow field plates or separator plates. Fluid flow field plates have at least one flow passage formed in at least one of the major planar surfaces thereof. The flow passages direct the fuel and oxidant to the respective electrodes, namely, the anode on the fuel side and the cathode on the oxidant side. The fluid flow field plates act as current collectors, provide support for the electrodes, provide access channels for the fuel and oxidant to the respective anode and cathode surfaces, and provide channels for the removal of reaction products, such as water, formed during operation of the cell.

Due to their zero- or low-emission nature, and ability to operate using renewable fuels, the use of fuel cells as primary and/or backup power supplies is likely to become increasingly prevalent. For example, a fuel cell stack can serve as an uninterruptible power supply for computer, medical, or refrigeration equipment in a home, office, or commercial environment. Other uses are of course possible.

SUMMARY OF THE INVENTION

Monitoring various operational characteristics of a fuel cell system allows the operating parameters to be varied to improve fuel cell system operating efficiency, and even to shut down the fuel cell system operation when above allowable thresholds. For example, the voltage across groups of fuel cells such as pairs of fuel cells, may indicate system problems such as a failure to receive proper amounts of reactant, requiring corrective action or even shut down. Consequently, there is a need for improved fuel cell control systems and for methods of controlling such fuel cell systems, particularly with respect to the monitoring of voltage across the various constituent fuel cells.

In one aspect, a fuel cell system includes a fuel cell stack having at least two fuel cell structures, each fuel cell structure having a pair of fuel cells. A respective pnp bipolar junction transistor is provided for each fuel cell structure and is coupled to respond to a voltage across the pair of cells in the fuel cell structure. The pnp bipolar junction transistor comprises a base, an emitter and a collector. An optoisolator is also provided for each fuel cell structure, each optoisolator having an output including a first terminal, a second terminal, and an input including a switching terminal. The first terminal is coupled to a ground, the second terminal is coupled to a positive reference voltage that is positive with respect to the ground and the switching terminal is coupled between the collector of the transistor and a negative reference voltage that has a voltage less than a lowest voltage of the respective fuel cell structure. The fuel cell system can further include a fuel cell structure AND circuit for AND-ING the outputs of each of the optoisolators of the respective fuel cell structures.

In another aspect a fuel cell system includes at least one fuel cell structure including one ore more fuel cells, at least one pnp bipolar transistor having a base, an emitter and a collector, the transistor coupled to respond to a voltage across the fuel cell structure, and an alarm circuit coupled to the collector of the transistor.

In an additional aspect, a monitoring system for monitoring the fuel cells includes a transistor having a first terminal, a second terminal and a switching terminal, the first terminal and the switching terminal of the transistor couplable to respond to a voltage across at least two fuel cells. The monitoring system also includes an optoisolator having a first terminal, a second terminal and a switching terminal, the first terminal of the optoisolator coupled to a ground reference voltage, the switching terminal coupled between the second terminal of the transistor and a first reference voltage below the ground reference voltage for control by the transistor in response to the voltage across the fuel cells, the second terminal of the optoisolator coupled to a second reference voltage above the ground reference voltage to produce a digital signal on the second terminal corresponding to an operational status of the fuel cells.

In a further aspect, a monitoring system for monitoring fuel cells includes a set of digitizing switches, each of the digitizing switches having a first terminal coupled to a ground and a second coupled to a positive reference voltage with respect to the ground, and a switching terminal coupled to a negative reference voltage with respect to the ground, each of the digitizing switches responsive to a first defined potential difference between the first terminal and the switching terminal of the respective digitizing switch, and a set of triggering switches, each of the triggering switches having a first terminal and a switching terminal couplable to respond to a voltage across a respective one of a number of fuel cell structures, and a second terminal coupled to the switching terminal of a respective one of the digitizing switches, each of the triggering switches responsive to a second defined potential difference between the first terminal and the switching terminal of the triggering switch.

In a further aspect a method of monitoring fuel cells in a fuel cell structure, includes monitoring a voltage across a pair of fuel cells electrically connected in series to form a fuel cell structure, producing a first indication when the voltage across the fuel cell structure is greater than a threshold voltage, and producing a second indication, different from the first indication, when the voltage across the fuel cell structure is not greater than the threshold voltage.

In yet a further aspect, a method of monitoring fuel cells in a fuel cell stack includes monitoring a voltage across a first set of at least two fuel cells in a fuel cell stack, simultaneously monitoring a voltage across a second set of at least two fuel cells in a fuel cell stack, producing a first indication when the voltage across each of the first and the second sets of at least two fuel cells in the fuel cell stack is greater than a threshold voltage, and producing a second indication when the voltage across any of the first and the second sets of fuel cells in the fuel cell stack is not greater than the threshold voltage. In this aspect, first and second transistors are preferably coupled to respond to a voltage across the first and second set of fuel cells respectively. Corresponding first and second optoisolators may be used in combination with the transistors.

In yet a further aspect, a method of monitoring fuel cells in a fuel cell stack includes simultaneously monitoring a respective voltage across at least two sets of fuel cells in a fuel cell stack, each set of fuel cells including at least two fuel cells, and producing a first indication when the voltage across any set of at least two fuel cells is not greater than a threshold voltage.

The fuel cells recited in the above described embodiments are preferably solid polymer fuel cells, comprising an anode, a cathode and an ion-exchange membrane electrolyte disposed therebetween, and optionally components.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, have been selected solely for ease of recognition in the drawings.

FIGS. 10A–H is a schematic drawing of the cell voltage checker sensor including a number of the circuits of FIG. 9.

FIG. 12 is a map showing the positional relationship of FIGS. 10A–10H.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well known structures associated with fuel cells, microcontrollers, sensors, and actuators have not been described in detail to avoid unnecessarily obscuring the descriptions of the embodiments of the invention.

Unless the context requires otherwise, throughout the specification and claims which follow, the word "comprise" and variations thereof, such as "comprises" and "comprising" are to be construed in an open, inclusive sense, that is as "including but not limited to."

Fuel Cell System Overview

Figure 1:
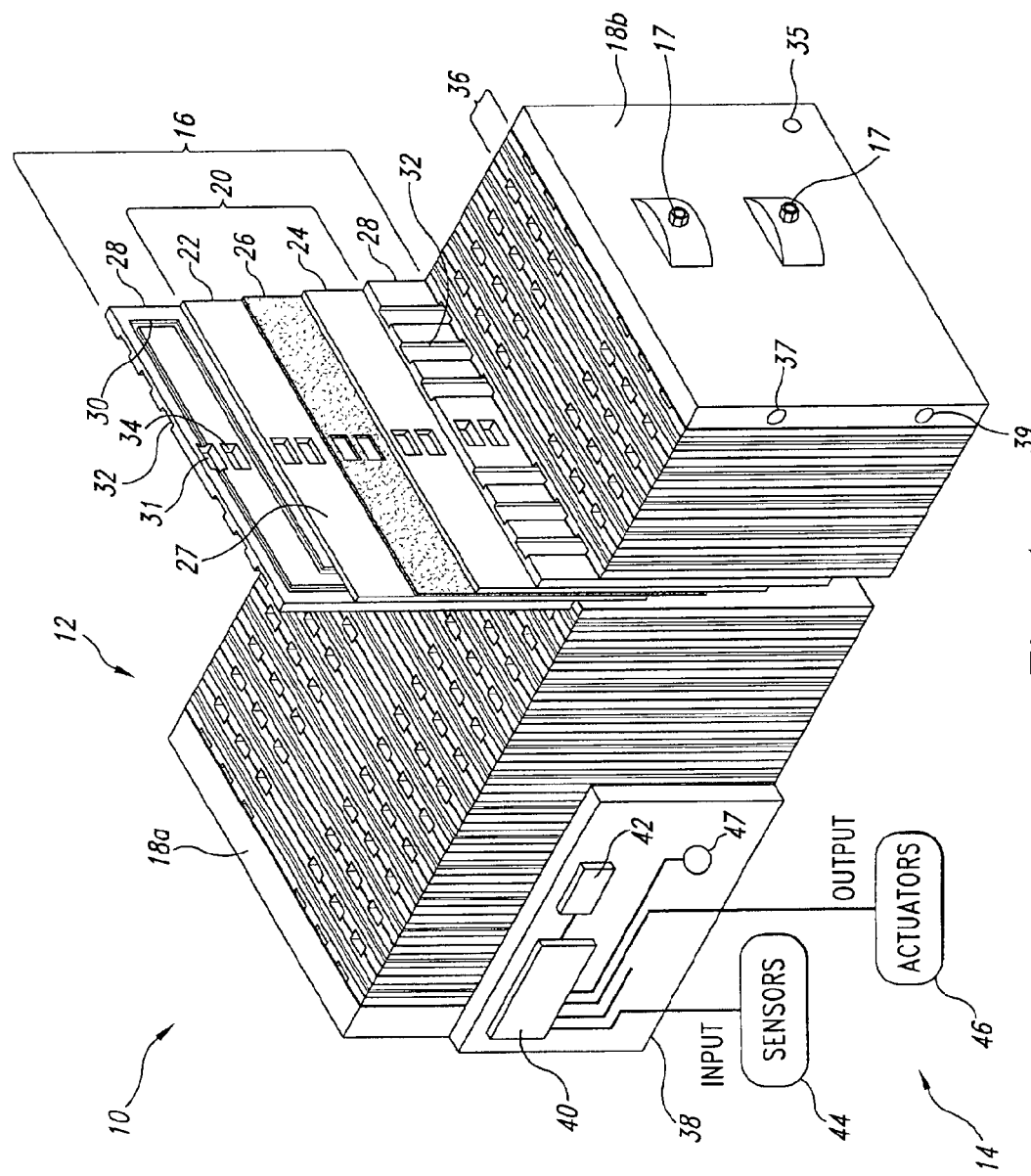
FIG. 1 is an isometric, partially exploded, view of a fuel cell system including a fuel cell stack and controlling electronics including a fuel cell monitoring and control system.

FIG. 1 shows a portion of a fuel cell system 10, namely, a fuel cell stack 12 and an electronic fuel cell monitoring and control system 14. Fuel cell stack 12 includes a number of fuel cell assemblies 16 arranged between a pair of end plates 18a, 18b, one of the fuel cell assemblies 16 being partially removed from fuel cell stack 12 to better illustrate the structure of fuel cell assembly 16. Tie rods (not shown) extend between end plates 18a, 18b and cooperate with fastening nuts 17 to bias end plates 18a, 18b together by applying pressure to the various components to ensure good contact therebetween.

Each fuel cell assembly 16 includes a membrane electrode assembly 20 including two electrodes, the anode 22 and the cathode 24, separated by an ion exchange membrane 26. Electrodes 22, 24 can be formed from a porous, electrically conductive sheet material, such as carbon fiber paper or cloth, that is permeable to the reactants. Each of electrodes 22, 24 is coated on a surface adjacent the ion exchange membrane 26 with a catalyst 27, such as a thin layer of platinum, to render each electrode electrochemically active.

The fuel cell assembly 16 also includes a pair of separators or flow field plates 28 sandwiching membrane electrode assembly 20. In the illustrated embodiment, each of the flow field plates 28 includes one or more reactant channels 30 formed on a planar surface of flow field plate 28 adjacent an associated one of the electrodes 22, 24 for carrying fuel to anode 22 and oxidant to cathode 24, respectively. (Reactant channel 30 on only one of flow field plates 28 is visible in FIG. 1.) The reactant channels 30 that carry the oxidant also carry exhaust air and product water away from cathode 24. As will be described in more detail below, fuel stack 12 is designed to operate in a dead-ended fuel mode, thus substantially all of the hydrogen fuel supplied to it during operation is consumed, and little if any hydrogen is carried away from stack 12 in normal operation of system 10. However, embodiments of the present invention can also be applicable to fuel cell systems operating on dilute fuels which are not dead-ended.

In the illustrated embodiment, each flow field plate 28 preferably includes a plurality of cooling channels 32 formed on the planar surface of the flow field plate 28 opposite the planar surface having reactant channel 30. When the stack is assembled, the cooling channels 32 of each adjacent fuel cell assembly 16 cooperate so that closed cooling channels 32 are formed between each membrane electrode assembly 20. The cooling channels 32 transmit cooling air through the fuel stack 12. The cooling channels are preferably straight and parallel to each other, and traverse each plate 28 so that cooling channel inlets and outlets are located at respective edges of plate 28.

While the illustrated embodiment includes two flow field plates 28 in each fuel cell assembly 16, other embodiments can include a single bipolar flow field plate (not shown) between adjacent membrane electrode assemblies 20. In such embodiments, a channel on one side of the bipolar plate carries fuel to the anode of one adjacent membrane electrode assembly 20, while a channel on the other side of the plate carries oxidant to the cathode of another adjacent membrane electrode assembly 20. In such embodiments, additional flow field plates 28 having channels for carrying coolant (e.g., liquid or gas, such as cooling air) can be spaced throughout fuel cell stack 12, as needed to provide sufficient cooling of stack 12.

End plate 18a includes a fuel stream inlet port (not shown) for introducing a supply fuel stream into fuel cell stack 12. End plate 18b includes a fuel stream outlet port 35 for discharging an exhaust fuel stream from fuel cell stack 12 that comprises primarily water and non-reactive components and impurities, such as any introduced in the supply fuel stream or entering the fuel stream in stack 12. Fuel stream outlet port 35 is normally closed with a valve in dead-ended operation. Although fuel cell stack 12 is designed to consume substantially all of the hydrogen fuel supplied to it during operation, traces of unreacted hydrogen may also be discharged through the fuel stream outlet port 35 during a purge of fuel cell stack 12, effected by temporarily opening a valve at fuel stream outlet port 35. Each fuel cell assembly 16 has openings formed therein to cooperate with corresponding openings in adjacent assemblies 16 to form internal fuel supply and exhaust manifolds (not shown) that extend the length of stack 12. The fuel stream inlet port is fluidly connected to fluid outlet port 35 via respective reactant channels 30 that are in fluid communication with the fuel supply and exhaust manifolds, respectively.

The end plate 18b includes an oxidant stream inlet port 37 for introducing supply air (oxidant stream) into fuel cell stack 12, and an oxidant stream outlet port 39 for discharging exhaust air from fuel cell stack 12. Each fuel cell assembly 16 has openings 31, 34, formed therein to cooperate with corresponding openings in adjacent fuel cell assemblies 16 to form oxidant supply and exhaust manifolds that extend the length of stack 12. The oxidant inlet port 37 is fluidly connected to the oxidant outlet port 39 via respective reactant channels 30 that are in fluid communication with oxidant supply and exhaust manifolds, respectively.

In one embodiment, fuel cell stack 12 includes forty-seven fuel cell assemblies 16. (FIGS. 1 and 2 omit a number of the fuel cell assemblies 16 to enhance drawing clarity). Fuel cell stack 12 can include a greater or lesser number of fuel cell assemblies to provide more or less power, respectively.

Figure 2:
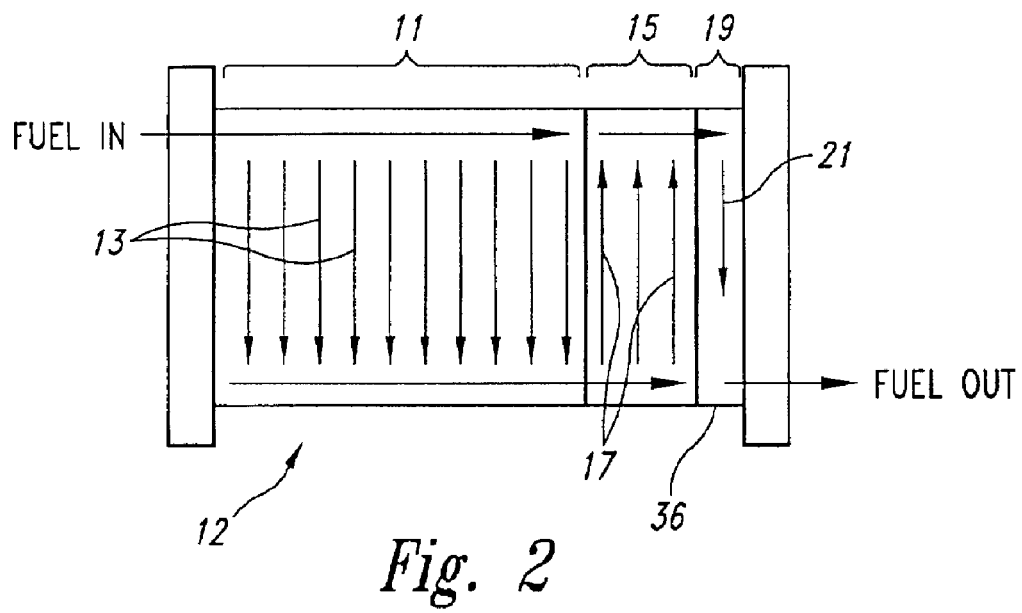
FIG. 2 is a schematic diagram representing fuel flow through a cascaded fuel cell stack of the fuel cell system of FIG. 1.

As shown in FIG. 2, fuel is directed through fuel cell stack 12 in a cascaded flow pattern. A first set 11 composed of the first forty-three fuel cell assemblies 16 are arranged so that fuel flows within the set in a concurrent parallel direction (represented by arrows 13) that is generally opposite the direction of the flow of coolant through fuel cell stack 12. Fuel flow through a next set 15 of two fuel cell assemblies 16 is in series with respect to the flow of fuel in the first set 11, and in a concurrent parallel direction within the set 15 (in a direction represented by arrows 17) that is generally concurrent with the direction of the flow of coolant through fuel cell stack 12. Fuel flow through a final set 19 of two fuel cells assemblies 16 is in series with respect to the first and second sets 11, 15, and in a concurrent parallel direction within the set 19 (in a direction represented by arrow 21) generally opposite the flow of coolant through fuel cell stack 12. The oxidant is supplied to each of the forty-seven fuel cells in parallel, in the same general direction as the flow of coolant through fuel cell stack 12.

The final set 19 of fuel cell assemblies 16 comprises the purge cell portion 36 of the fuel cell stack. The purge cell portion 36 accumulates non-reactive components which are periodically vented by opening a purge valve.

Each membrane electrode assembly 20 is designed to produce a nominal potential difference of nominally about 0.6 V between anode 22 and cathode 24. Reactant streams (hydrogen and air) are supplied to electrodes 22, 24 on either side of ion exchange membrane 26 through reactant channels 30. Hydrogen is supplied to anode 22, where platinum catalyst 27 promotes its separation into protons and electrons, which pass as useful electricity through an external circuit (not shown). On the opposite side of membrane electrode assembly 20, air flows through reactant channels 30 to cathode 24 where oxygen in the air reacts with protons passing through the ion exchange membrane 26 to produce product water.

Fuel Cell System Sensors and Actuators

With continuing reference to FIG. 1, the electronic control system 14 comprises various electrical and electronic components on a circuit board 38 and various sensors 44 and actuators 46 distributed throughout fuel cell system 10. The circuit board 38 carries a microprocessor or microcontroller 40 that is appropriately programmed or configured to carry out fuel cell system operation. The microcontroller 40 can take the form of an Atmel AVR RISC microcontroller available from Atmel Corporation of San Jose, Calif. The electronic control system 14 also includes a persistent memory 42, such as an EEPROM portion of the microcontroller 40 or discrete nonvolatile controller-readable media.

Microcontroller 40 is coupled to receive input from sensors 44 and to provide output to actuators 46. The input and/or output can take the form of either digital and/or analog signals. A rechargeable battery 47 powers the electronic control system 14 until fuel cell stack 12 can provide sufficient power to electronic control system 14. The microcontroller 40 is selectively couplable between fuel cell stack 12 and battery 47 for switching power during fuel cell system operation and/or to recharge battery 47 during fuel cell operation.

Figure 3:
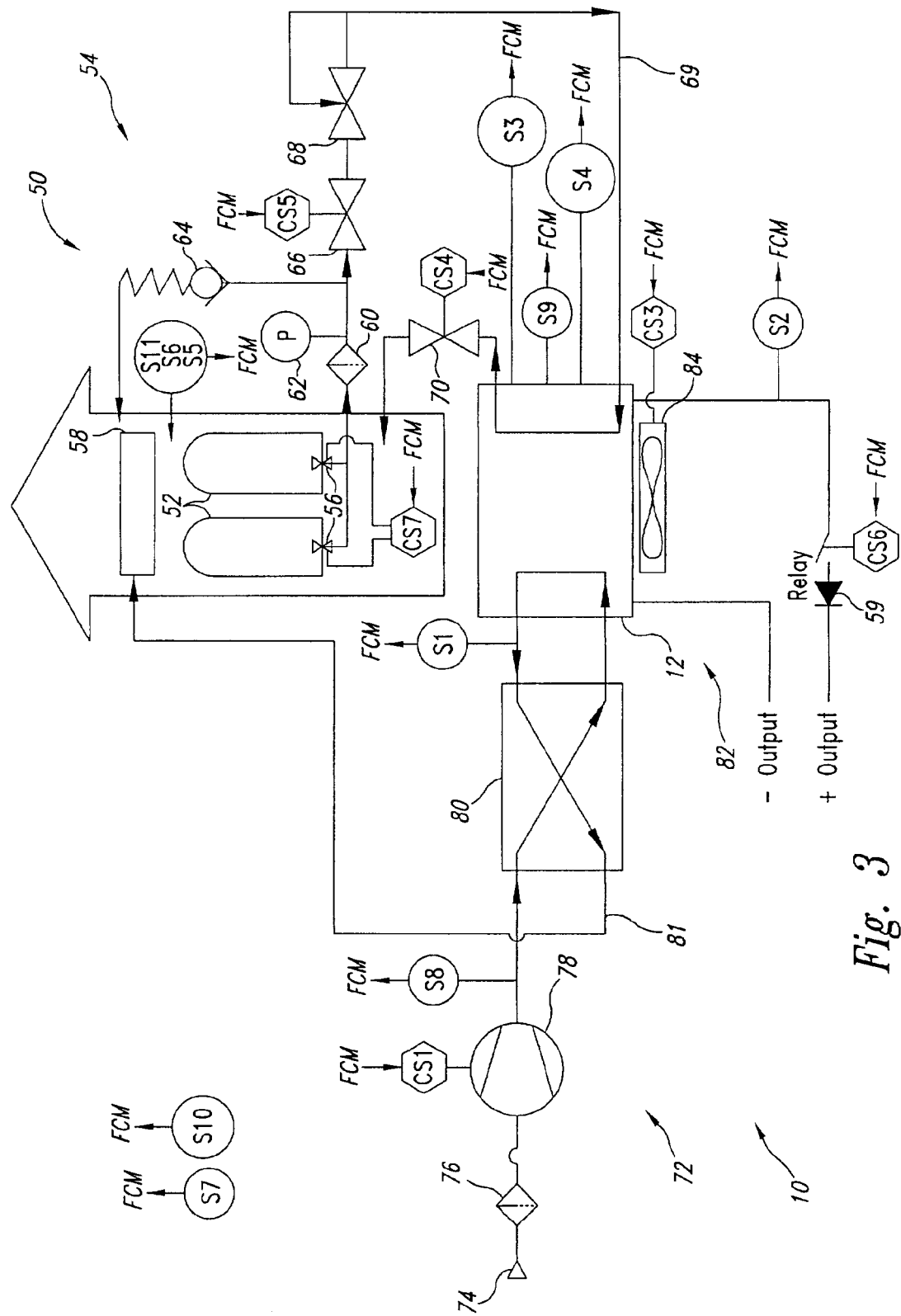
FIG. 3 is a schematic diagram of a portion of the fuel cell monitoring and control system of FIG. 1.

FIG. 3 show various elements of fuel cell system 10 in further detail, and shows various other elements that were omitted from FIG. 1 for clarity of illustration.

With particular reference to FIG. 3, fuel cell system 10 provides fuel (e.g., hydrogen) to anode 22 by way of a fuel system 50. Fuel system 50 includes a source of fuel such as one or more fuel tanks 52, and a fuel regulating system 54 for controlling delivery of the fuel. Fuel tanks 52 can contain hydrogen, or some other fuel such as methanol. Alternatively, fuel tanks 52 can represent a process stream from which hydrogen can be derived by reforming, such as methane or natural gas (in which case a reformer is provided in fuel cell system 10).

Fuel tanks 52 each include a fuel tank valve 56 for controlling the flow of fuel from respective fuel tank 52. Fuel tank valves 56 may be automatically controlled by microcontroller 40, and/or manually controlled by a human operator. Fuel tanks 52 may be refillable, or may be disposable. Fuel tanks 52 may be integral to fuel system 50 and/or fuel cell system 10, or can take the form of discrete units. In this embodiment, fuel tanks 52 are hydride storage tanks. Fuel tanks 52 are positioned within fuel cell system 10 such that they are heatable by exhaust cooling air warmed by heat generated by fuel cell stack 12. Such heating facilitates the release of hydrogen from the hydride storage media.

Fuel cell monitoring and control system 14 includes a hydrogen concentration sensor S5, hydrogen heater current sensor S6 and a hydrogen sensor check sensor S11. Hydrogen heater current sensor S6 can take the form of a current sensor that is coupled to monitor a hydrogen heater element that is an integral component of hydrogen concentration sensor S5. Hydrogen sensor check sensor S11 monitors voltage across a positive leg of a Wheatstone bridge in a hydrogen concentration sensor S5, discussed below, to determine whether hydrogen concentration sensor S5 is functioning.

Fuel tanks 52 are coupled to the fuel regulating system 54 through a filter 60 that ensures that particulate impurities do not enter fuel regulating system 54. Fuel regulating system 54 includes a pressure sensor 62 to monitor the pressure of fuel in fuel tanks 52, which indicates how much fuel remains in fuel tanks 52. A pressure relief valve 64 automatically operates to relieve excess pressure in fuel system 50. Pressure relief valve 64 can take the form of a spring and ball relief valve. A main gas valve solenoid CS5 opens and closes a main gas valve 66 in response to signals from the microcontroller 40 to provide fluid communication between the fuel tanks 52 and fuel regulating system 54. Additional fuel tank controllers CS7 such as solenoids control flow through the fuel tank valves 56. A hydrogen regulator 68 regulates the flow of hydrogen from fuel tanks 52. Fuel is delivered to the anodes 22 of the fuel cell assemblies 16 through a hydrogen inlet conduit 69 that is connected to fuel stream inlet port of stack 12.

Sensors 44 of fuel regulating system 54 monitor a number of fuel cell system operating parameters to maintain fuel cell system operation within acceptable limits. For example, a stack voltage sensor S3 measures the gross voltage across fuel cell stack 12. A purge cell voltage sensor S4 monitors the voltage across purge cell portion 36 (the final set 19 of fuel cell assemblies 16 in cascaded design of FIG. 2). A cell voltage checker S9 ensures that a voltage across each of the fuel cell assemblies 16 is within an acceptable limit. Each of the sensors S3, S4, S9 provide inputs to microcontroller 40, identified in FIG. 3 by arrows pointing toward the blocks labeled "FCM" (i.e., fuel cell microcontroller 40).

A fuel purge valve 70 is provided at fuel stream outlet port 35 of fuel cell stack 12 and is typically in a closed position when stack 12 is operating. Fuel is thus supplied to fuel cell stack 12 only as needed to sustain the desired rate of electrochemical reaction. Because of the cascaded flow design, any impurities (e.g., nitrogen) in the supply fuel stream tend to accumulate in purge cell portion 36 during operation. A build-up of impurities in purge cell portion 36 tends to reduce the performance of purge cell portion 36; should the purge cell voltage sensor S4 detect a performance drop below a threshold voltage level, microcontroller 40 may send a signal to a purge valve controller CS4 such as a solenoid to open the purge valve 36 and discharge the impurities and other non-reactive components that may have accumulated in purge cell portion 36 (collectively referred to as "purge discharge"). The venting of hydrogen by the purge valve 70 during a purge is limited to prevent the monitoring and control system 14, discussed below, from triggering a failure or fault.

Fuel cell system 10 provides oxygen in an air stream to the cathode side of membrane electrode assemblies 20 by way of an oxygen delivery system 72. A source of oxygen or air 74 can take the form of an air tank or the ambient atmosphere. A filter 76 ensures that particulate impurities do not enter oxygen delivery system 72. An air compressor controller CS1 controls an air compressor 78 to provide the air to fuel cell stack 12 at a desired flow rate. A mass air flow sensor S8 measures the air flow rate into fuel cell stack 12, providing the value as an input to microcontroller 40. A humidity exchanger 80 adds water vapor to the air to keep the ion exchange membrane 26 moist. The humidity exchanger 80 also removes water vapor which is a byproduct of the electrochemical reaction. Excess liquid water is provided to an evaporator 58.

Fuel cell system 10 removes excess heat from fuel cell stack 12 and uses the excess heat to warm fuel tanks 52 by way of a cooling system 82. Cooling system 82 includes a fuel cell temperature sensor S1, for example a thermister that monitors the core temperature of fuel cell stack 12. The temperature is provided as input to microcontroller 40. A stack current sensor S2, for example a Hall sensor, measures the gross current through fuel cell stack 12, and provides the value of the current as an input to microcontroller 40. A cooling fan controller CS3 controls the operation of one or more cooling fans 84 for cooling fuel cell stack 12. After passing through fuel cell stack 12, the warmed cooling air circulates around the fuel tanks 52. The warmed cooling air then passes through the evaporator 58. A power circuit relay controller CS6 connects, and disconnects, fuel cell stack 12 to, and from, an external electrical circuit in response to microcontroller 40. A power diode 59 provides one-way isolation of fuel cell system 10 from the external load to provide protection to fuel cell system 10 from the external load. A battery relay controller CS8 connects, and disconnects, fuel cell monitoring and control system 14 between fuel cell stack 12 and the battery 47.

The fuel cell monitoring and control system 14 (illustrated in FIG. 4) includes sensors for monitoring fuel cell system 10 surroundings and actuators for controlling fuel cell system 10 accordingly. For example, a hydrogen concentration sensor S5 (shown in FIG. 3) for monitoring the hydrogen concentration level in the ambient atmosphere surrounding fuel cell stack 12. The hydrogen concentration sensor S5 can take the form of a heater element with a hydrogen sensitive thermister that may be temperature compensated. An oxygen concentration sensor S7 (illustrated in FIG. 4) to monitor the oxygen concentration level in the ambient atmosphere surrounding fuel cell system 10. An ambient temperature sensor S10 (shown in FIG. 3), for example a digital sensor, to monitor the ambient air temperature surrounding fuel cell system 10.

Figure 4:
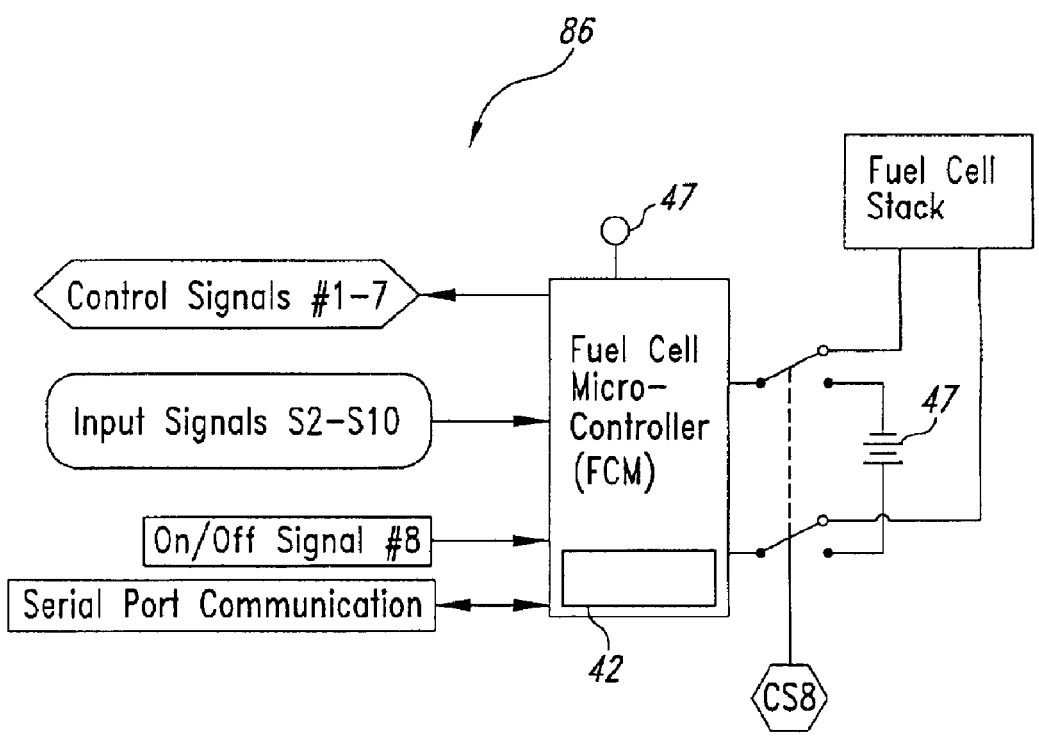
FIG. 4 is a schematic diagram of an additional portion of the fuel cell monitoring and control system of FIG. 3, including a fuel cell microcontroller selectively coupled between the fuel cell stack and a battery.

With reference to FIG. 4, microcontroller 40 receives the various sensor measurements such as ambient air temperature, fuel pressure, hydrogen concentration, oxygen concentration, fuel cell stack current, air mass flow, cell voltage check status, voltage across the fuel cell stack, and voltage across the purge cell portion of the fuel cell stack from various sensors described below. Microcontroller 40 provides the control signals to the various actuators, such as air compressor controller CS1, cooling fan controller CS3, purge valve controller CS4, main gas valve solenoid CS5, power circuit relay controller CS6, hydride tank valve solenoid CS7, and battery relay controller CS8.

Fuel Cell System Structural Arrangement

FIGS. 5–8 illustrate the structural arrangement of the components in fuel cell system 10. For convenience, "top", "bottom", "above", "below" and similar descriptors are used merely as points of reference in the description, and while corresponding to the general orientation of the illustrated fuel cell system 10 during operation, are not to be construed to limit the orientation of fuel cell system 10 during operation or otherwise.

Figure 5:
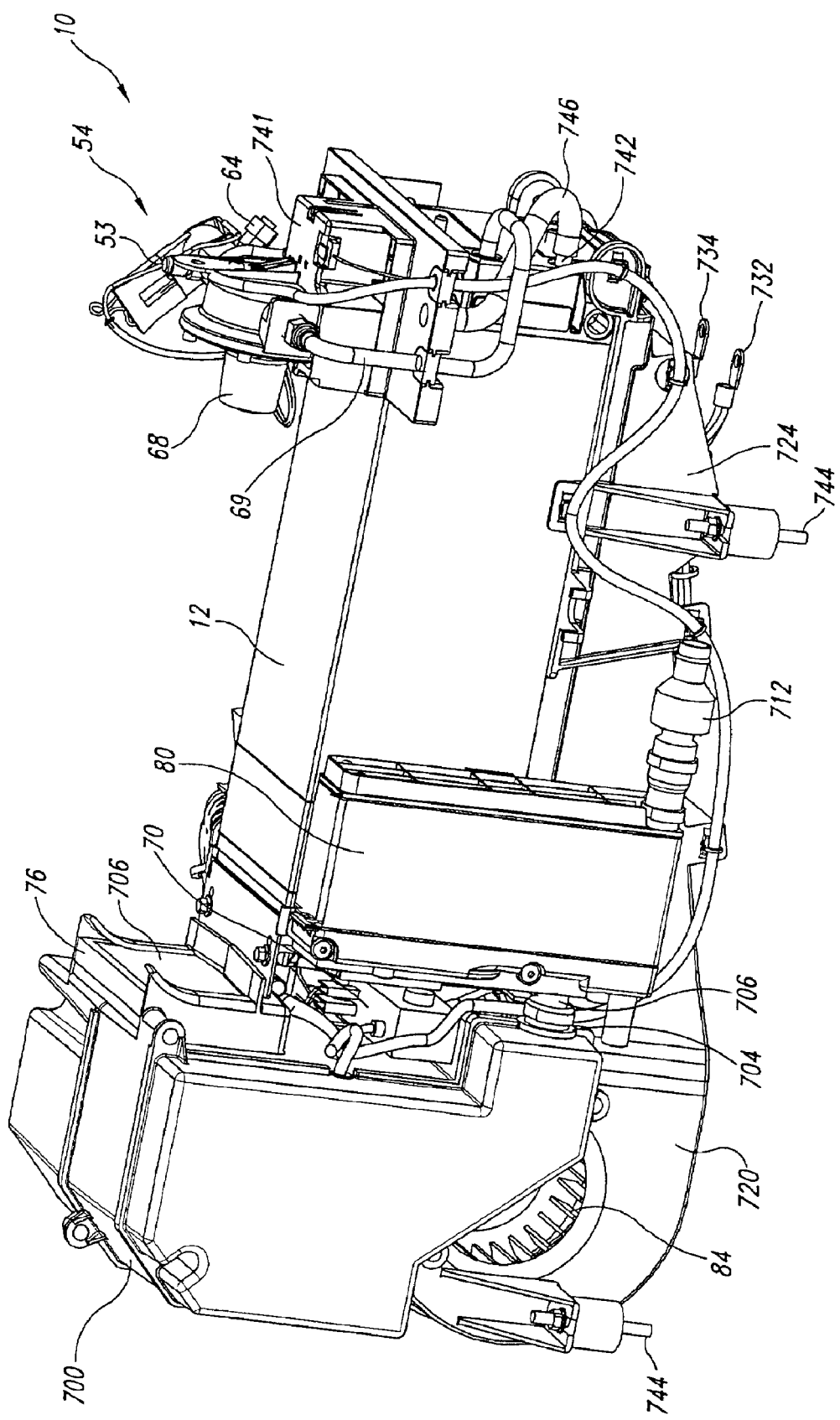
FIG. 5 is a top, right isometric view of a structural arrangement of various components of the fuel cell system of FIG. 1.
Figure 6:
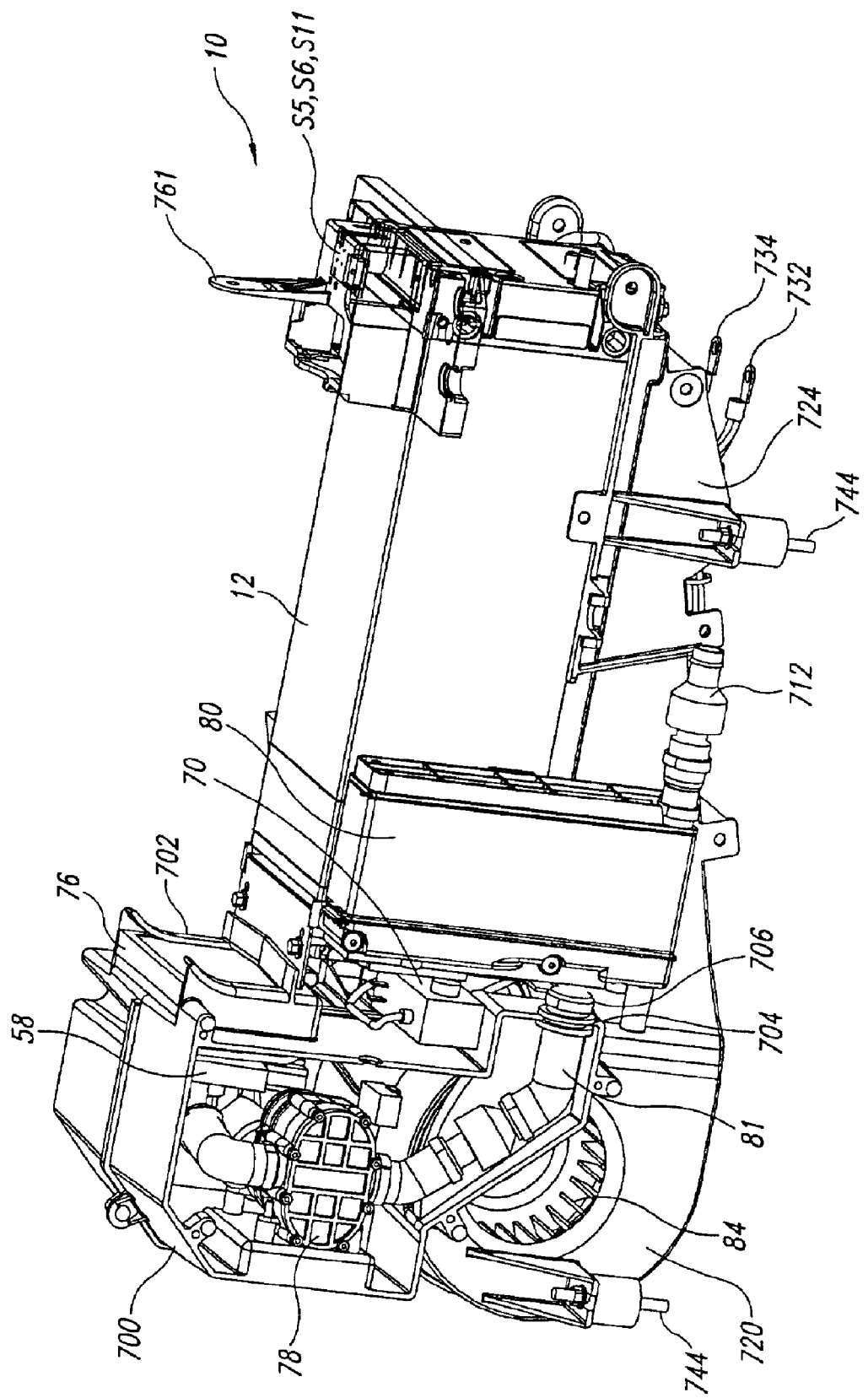
FIG. 6 is a top, right isometric view of the structural arrangement of various components of the fuel cell system of FIG. 5 with a cover removed.
Figure 7:
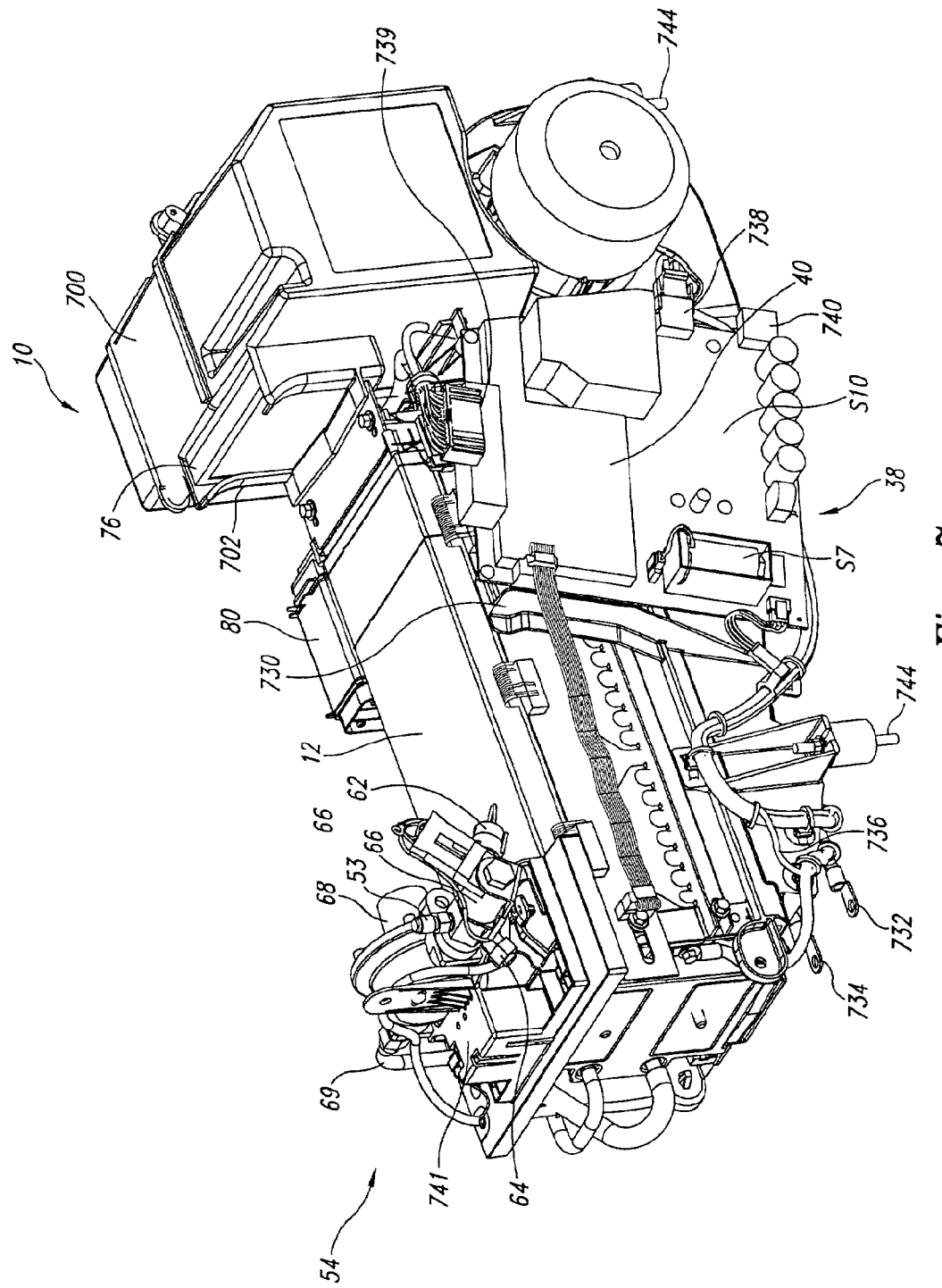
FIG. 7 is top, left isometric view of the structural arrangement of various components of the fuel cell system of FIG. 5.

Referring to FIGS. 5–7, the air compressor 78 and cooling fan 84 are grouped together at one end ("air supply end") of fuel cell stack 12. Fuel tanks 52 (not shown in FIGS. 5–7) are mountable to fuel cell system 10 on top of, and along the length of, fuel cell stack 12. The components of fuel regulating system 54 upstream of fuel cell stack 12 are located generally at the end of stack 12 ("hydrogen supply end") opposite the air supply end.

Air compressor 78 is housed within an insulated housing 700 that is removably attached to fuel cell stack 12 at the air supply end. The housing 700 has an air supply aperture 702 covered by the filter 76 that allows supply air into housing 700. The air compressor 78 is a positive displacement low pressure type compressor and is operable to transmit supply air to air supply conduit 81 at a flow rate controllable by the operator. An air supply conduit 81 passes through a conduit aperture 704 in compressor housing 700 and connects with an air supply inlet 706 of humidity exchanger 80. Mass flow sensor S8 is located on an inlet of air compressor 78 and preferably within compressor housing 700.

The humidity exchanger 80 may be of the type disclosed in U.S. Pat. No. 6,106,964, and is mounted to one side of fuel cell stack 12 near the air supply end. Air entering into humidity exchanger 80 via air supply conduit 81 is humidified and then exhausted from the humidity exchanger 80 and into fuel cell stack 12 (via the supply air inlet port of the end plate 18b). Exhaust air from fuel cell stack 12 exits via the exhaust air outlet port in end plate 18b and is directed into humidity exchanger 80, where water in the air exhaust stream is transferred to the air supply stream. The air exhaust stream then leaves the humidity exchanger 80 via the air exhaust outlet 712 and is transmitted via an air exhaust conduit (not shown) to evaporator 58 (not shown in FIGS. 5-7) mountable to a cover (not shown) above fuel cell stack 12.

Cooling fan 84 is housed within a fan housing 720 that is removably mounted to the air supply end of fuel cell stack 12 and below compressor housing 700. Fan housing 720 includes a duct 724 that directs cooling air from cooling fan 84 to the cooling channel openings at the bottom of fuel cell stack 12. Cooling air is directed upwards and through fuel cell stack 12 (via the cooling channels 32) and is discharged from the cooling channel openings at the top of fuel cell stack 12. During operation, heat extracted from fuel cell stack 12 by the cooling air is used to warm fuel tanks 52 that are mountable directly above and along the length of stack 12. Some of the warmed cooling air can be redirected into the air supply aperture 702 of compressor housing 700 for use as oxidant supply air.

Referring particularly to FIG. 7, circuit board 38 carrying microcontroller 40, oxygen sensor S7 and ambient temperature sensor S10 is mounted on the side of fuel cell stack 12 opposite humidity exchanger 80 by way of a mounting bracket 730. Positive and negative electrical power supply lines 732, 734 extend from each end of fuel cell stack 12 and are connectable to an external load. An electrically conductive bleed wire 736 from each of power supply lines 732, 734 connects to circuit board 38 at a stack power-in terminal 738 and transmits some of the electricity generated by fuel cell stack 12 to power the components on the circuit board 38, as well as sensors 44 and actuators 46 which are electrically connected to circuit board 38 at terminal 739. Similarly, battery 47 (not shown in FIGS. 5–7) is electrically connected to circuit board 38 at battery power in terminal 740. Battery 47 supplies power to the circuit board components, sensors 44 and actuators 46 when fuel cell stack output has not yet reached nominal levels (e.g., at start-up); once fuel cell stack 12 has reached nominal operating conditions, fuel cell stack 12 can also supply power to recharge the battery 47.

Figure 8:
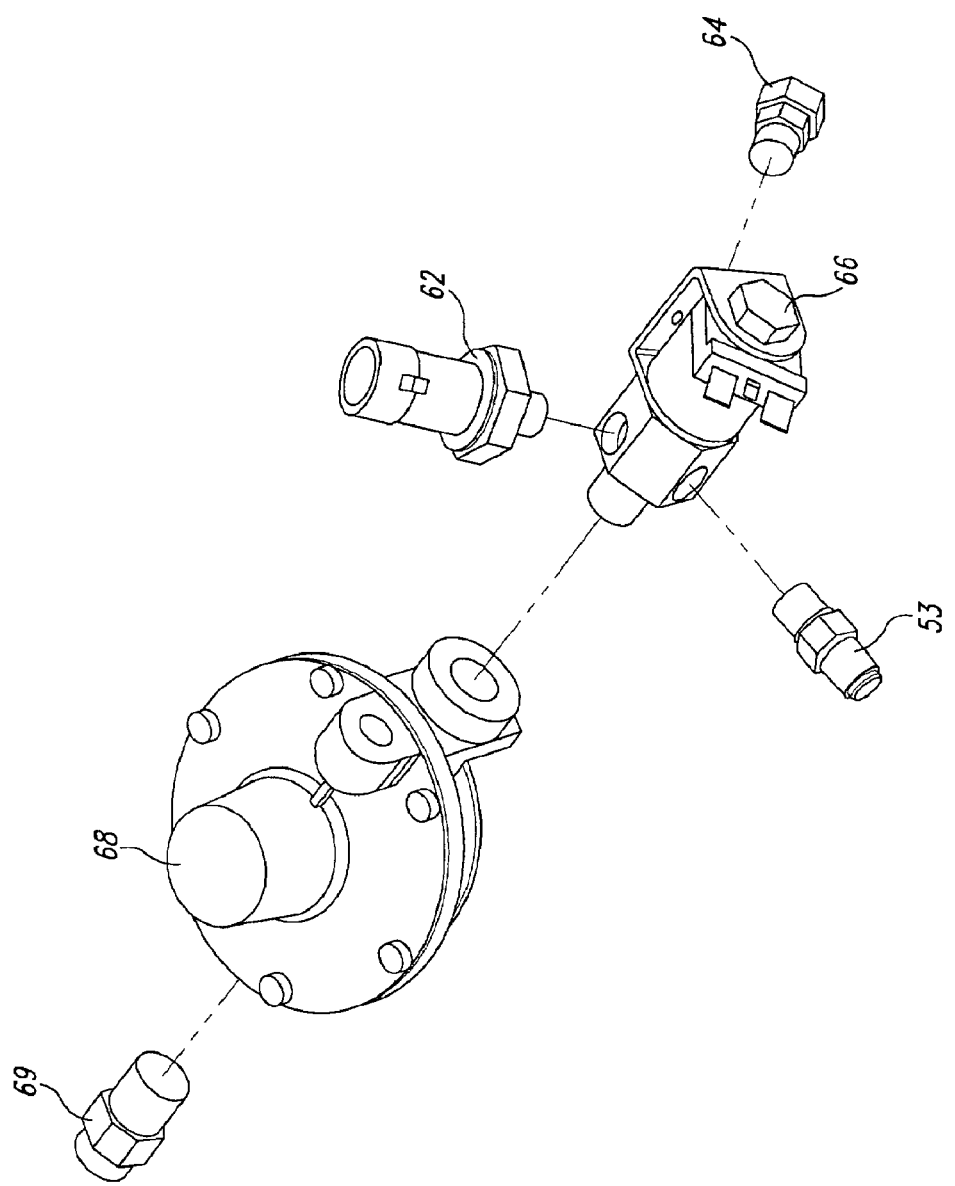
FIG. 8 is a top, right isometric view of a pressure regulator portion of the fuel cell system of FIG. 5.

Referring generally to FIGS. 5–7 and particularly to FIG. 8, a bracket 741 is provided at the hydrogen supply end for the mounting of a fuel tank valve connector 53, hydrogen pressure sensor 62, pressure relief valve 64, main gas valve 66, and hydrogen pressure regulator 68 above fuel cell stack 12 at the hydrogen supply end. A suitable pressure regulator may be a Type 912 pressure regulator available from Fisher Controls of Marshalltown, Iowa. A suitable pressure sensor may be a transducer supplied Texas Instruments of Dallas, Tex. A suitable pressure relief valve may be supplied by Schraeder-Bridgeport of Buffalo Grove, Ill. The pressure relief valve 64 is provided for fuel tanks 52 and may be set to open at about 350 psi. A low pressure relief valve 742 is provided for fuel cell stack 12. The bracket 741 also provides a mount for hydrogen concentration sensor S5, hydrogen heater current sensor S6 and hydrogen sensor check sensor S11, which are visible in FIG. 6 in which the bracket 741 is transparently illustrated in hidden line. The fuel tanks 52 are connectable to the fuel tank connector 53. When the fuel tank and main gas valves 56, 66 are opened, hydrogen is supplied under a controlled pressure (monitored by pressure sensor 62 and adjustable by hydrogen pressure regulator 68) through the fuel supply conduit 69 to the fuel inlet port of end plate 18a. The purge valve 70 is located at the fuel outlet port at end plate 18b.

Fuel cell system 10 and fuel tanks 52 are coupled to a base (not shown) at mounting points 744 and housed within a fuel cell system cover (not shown). Cooling air exhausted from the top of fuel cell stack 12 is thus directed by the cover either to the supply air inlet 702 or over fuel regulating system 54 to a cooling air discharge opening in the housing.

Fuel cell system 10 is designed so that components that are designed to discharge hydrogen or that present a risk of leaking hydrogen, are as much as practical, located in the cooling air path or have their discharge/leakage directed to the cooling air path. The cooling air path is defined by duct 724, cooling air channels of stack 12, and the portion of the system cover above stack 12; a cooling air stream passing through the cooling air path is shown by the arrows in FIGS. 5, 6 and 7. The components directly in the cooling air path include fuel tanks 52, and components of fuel regulating system 54 such as pressure relief valve 64, main gas valve 66, and hydrogen regulator 68. Components not directly in the cooling air path are fluidly connected to the cooling air path, and include purge valve 70 connected to duct 724 via purge conduit (not shown) and low pressure relief valve 742 connected to an outlet near fuel regulating system 54 via conduit 746. When cooling air fan 84 is operational, the cooling air stream carries leaked/discharged hydrogen through duct 724, past stack 12, and out of system 10 in the direction of the arrows shown in FIGS. 5, 6, and 7. Hydrogen concentration sensor S5 is strategically placed as far downstream as possible in the cooling air stream to detect hydrogen carried in the cooling air stream.

Hydrogen concentration sensor S5 is also placed in the vicinity of the components of fuel regulating system 54 to improve detection of hydrogen leaks/discharges from fuel regulating system 54.

Figure 9:
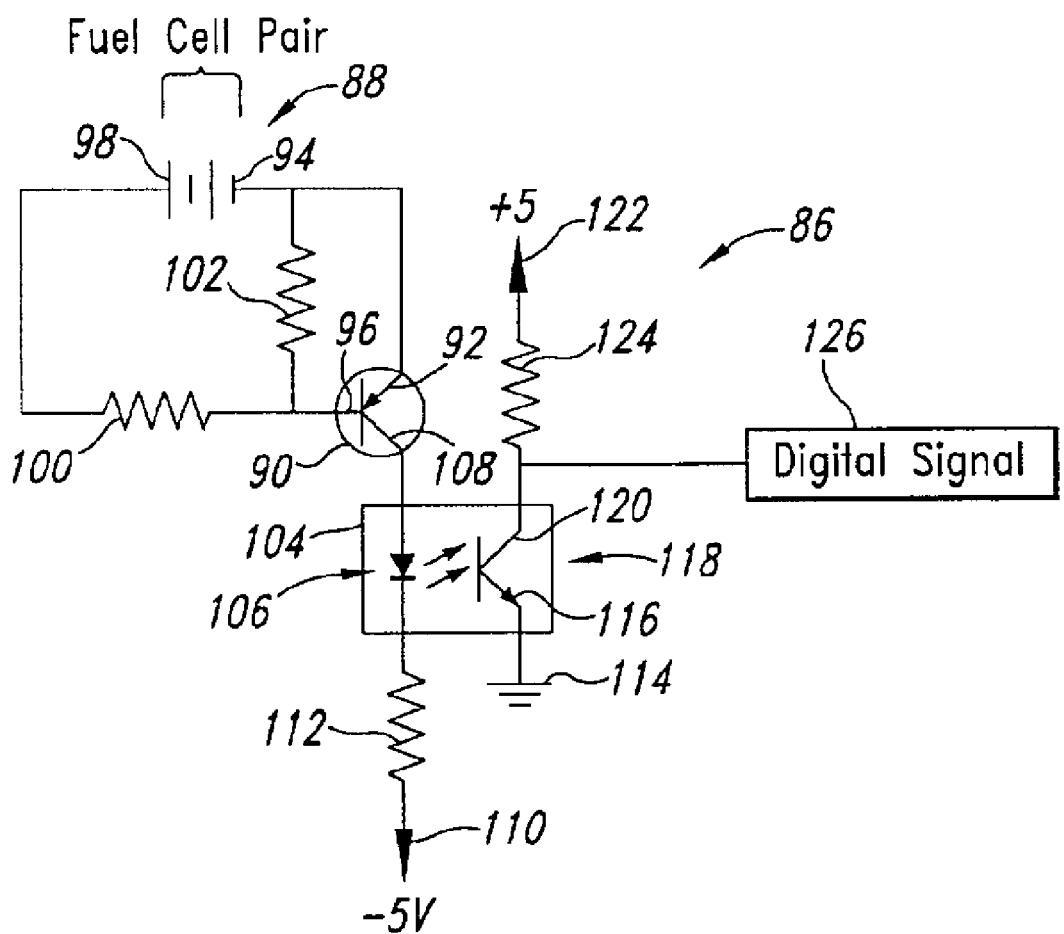
FIG. 9 is a schematic drawing of a portion of a cell voltage checker sensor circuit.
Figure 10A:
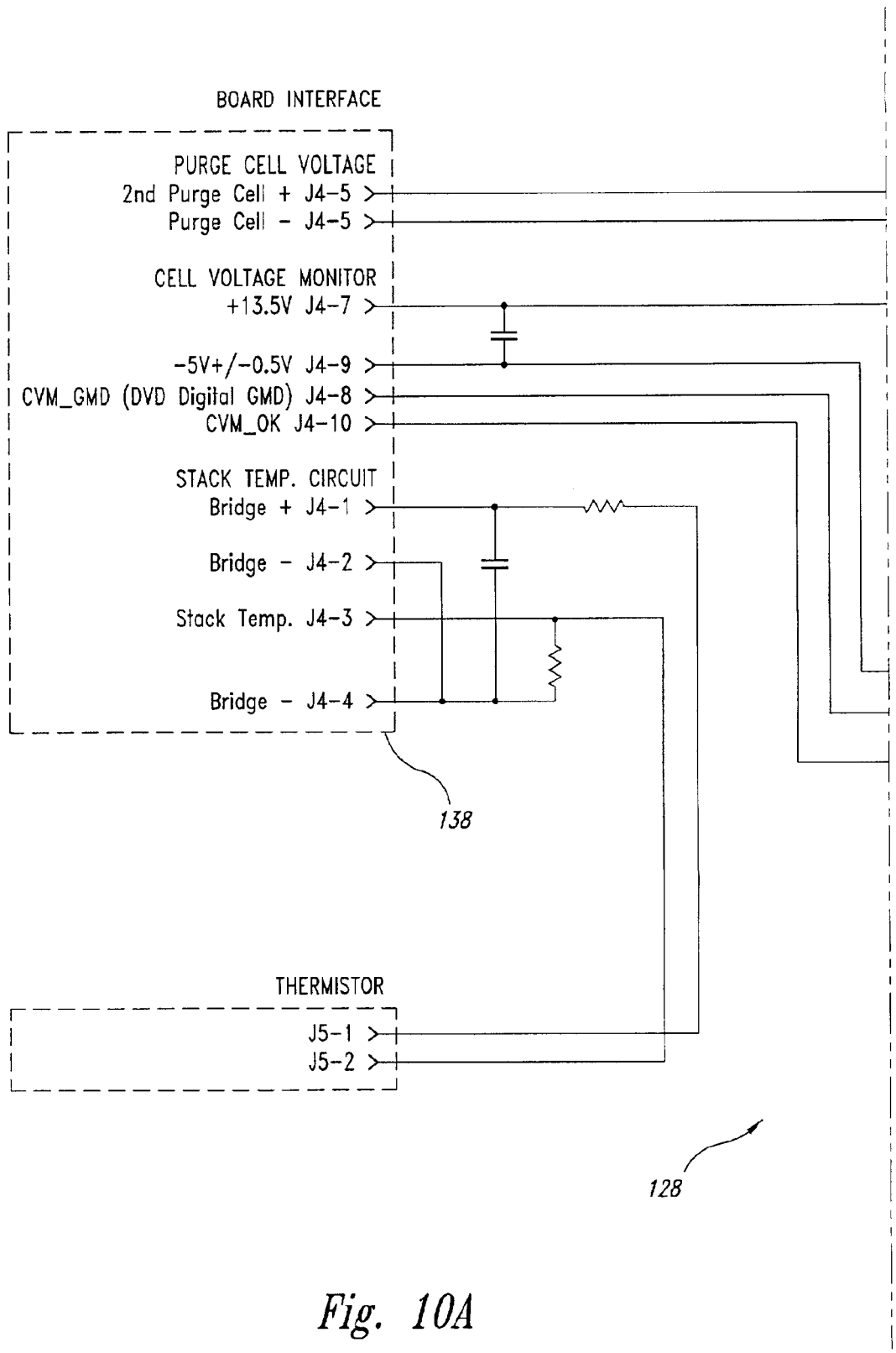
Figure 10B:
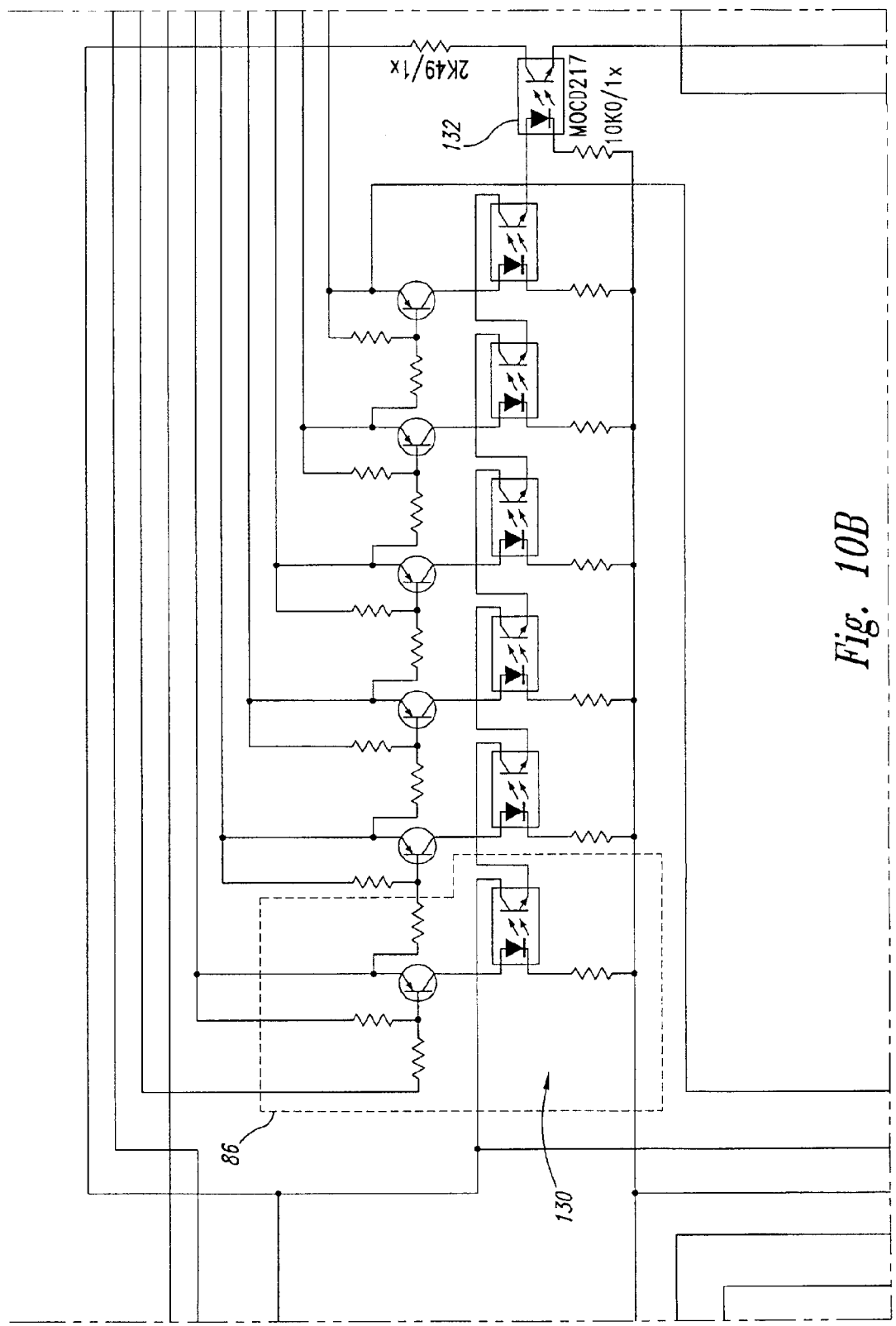
Figure 10C:
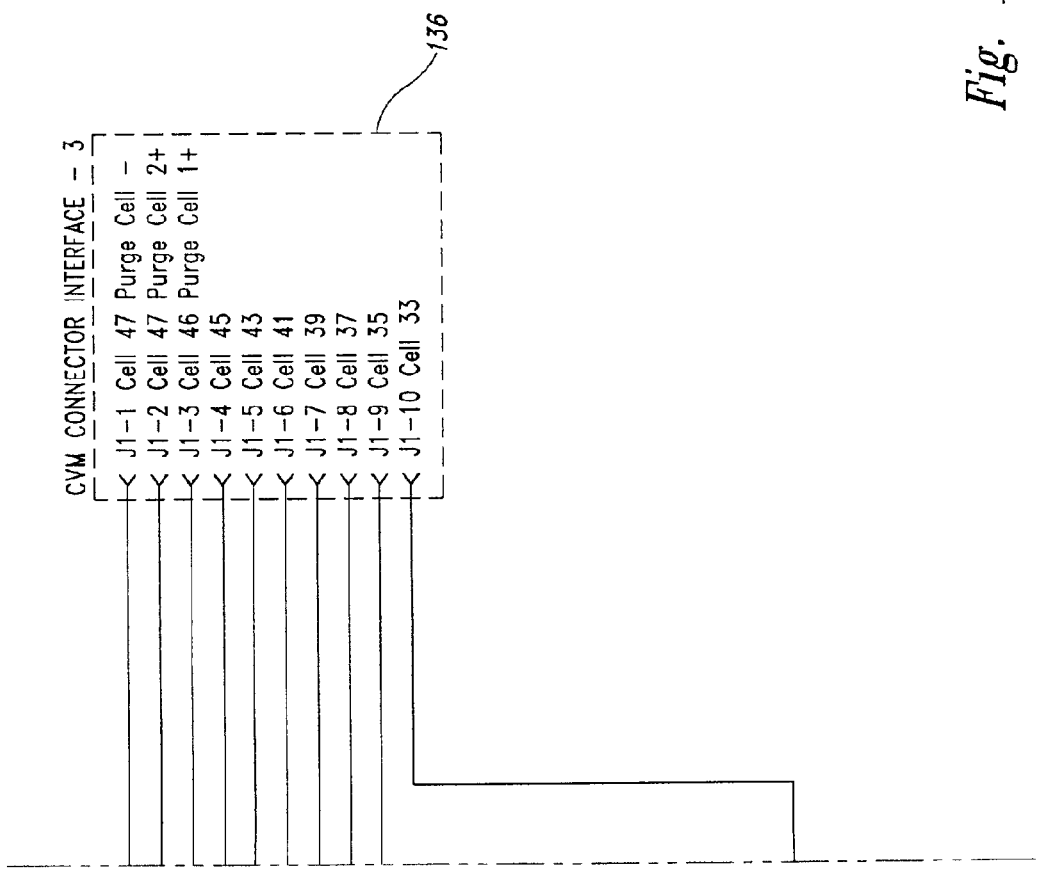
Figure 10D:
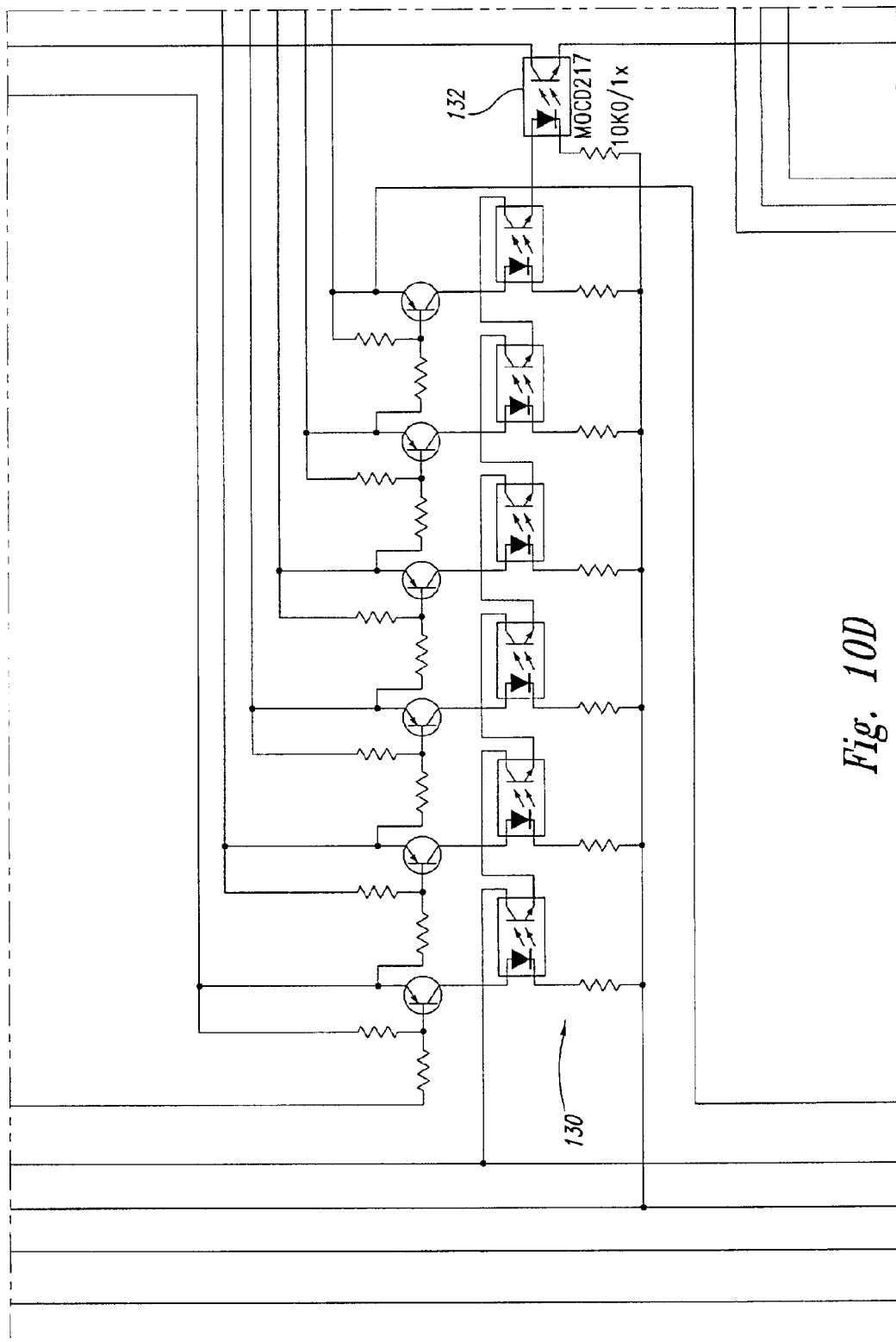
Figure 10E:
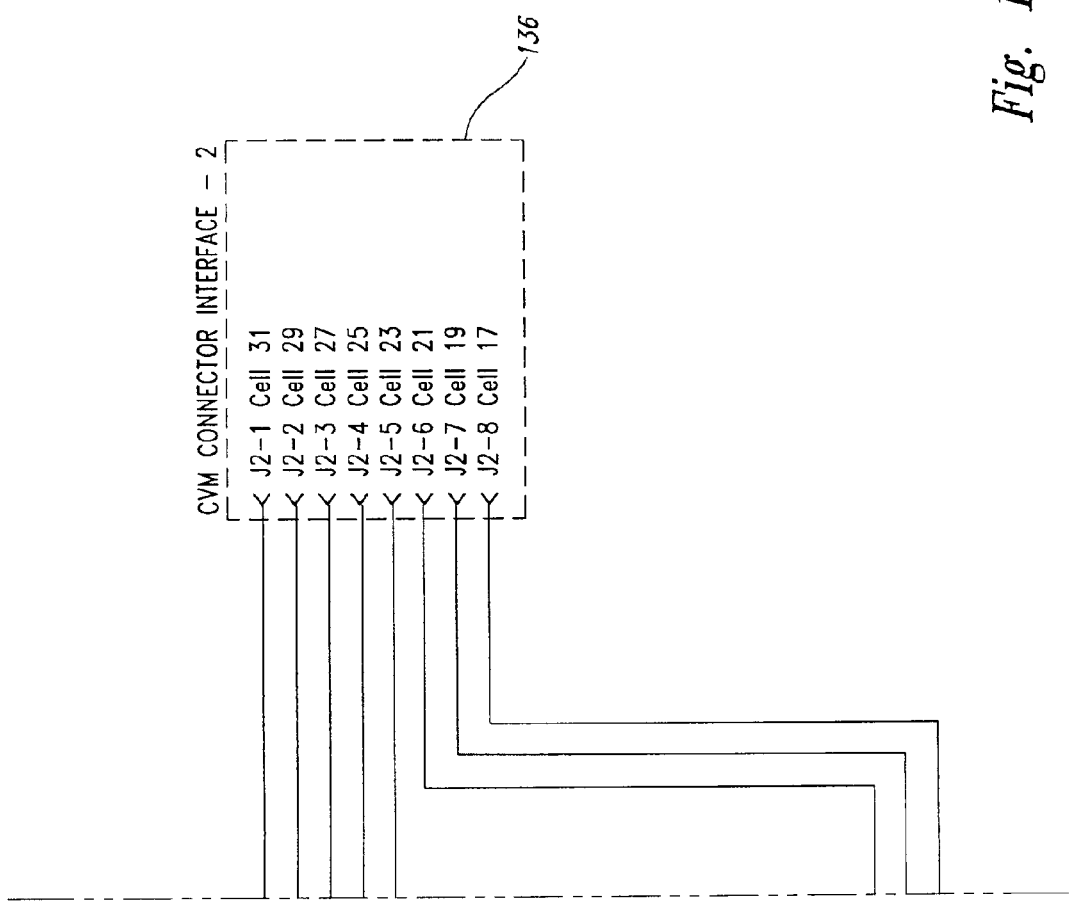
Figure 10F:
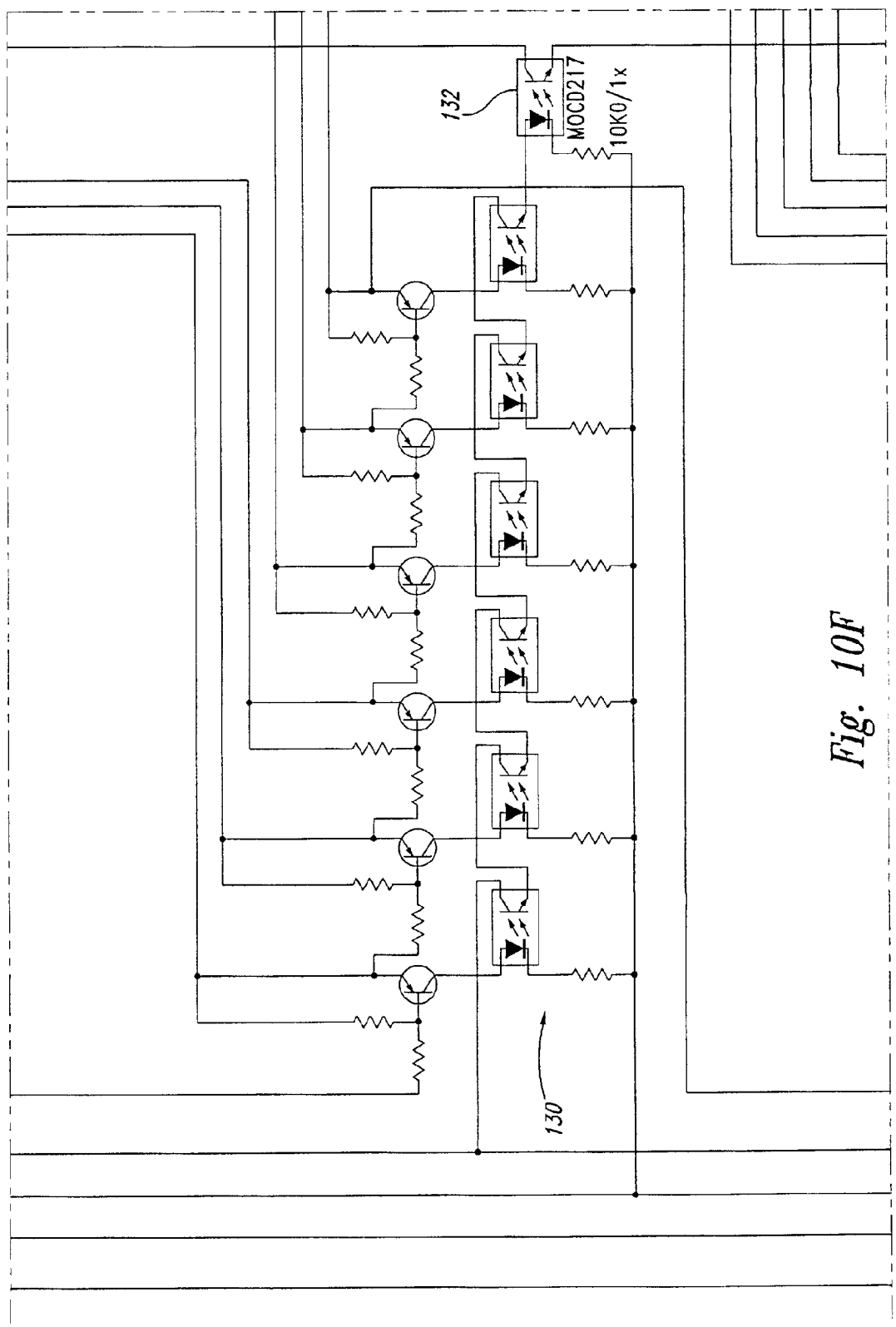
Figure 10H:
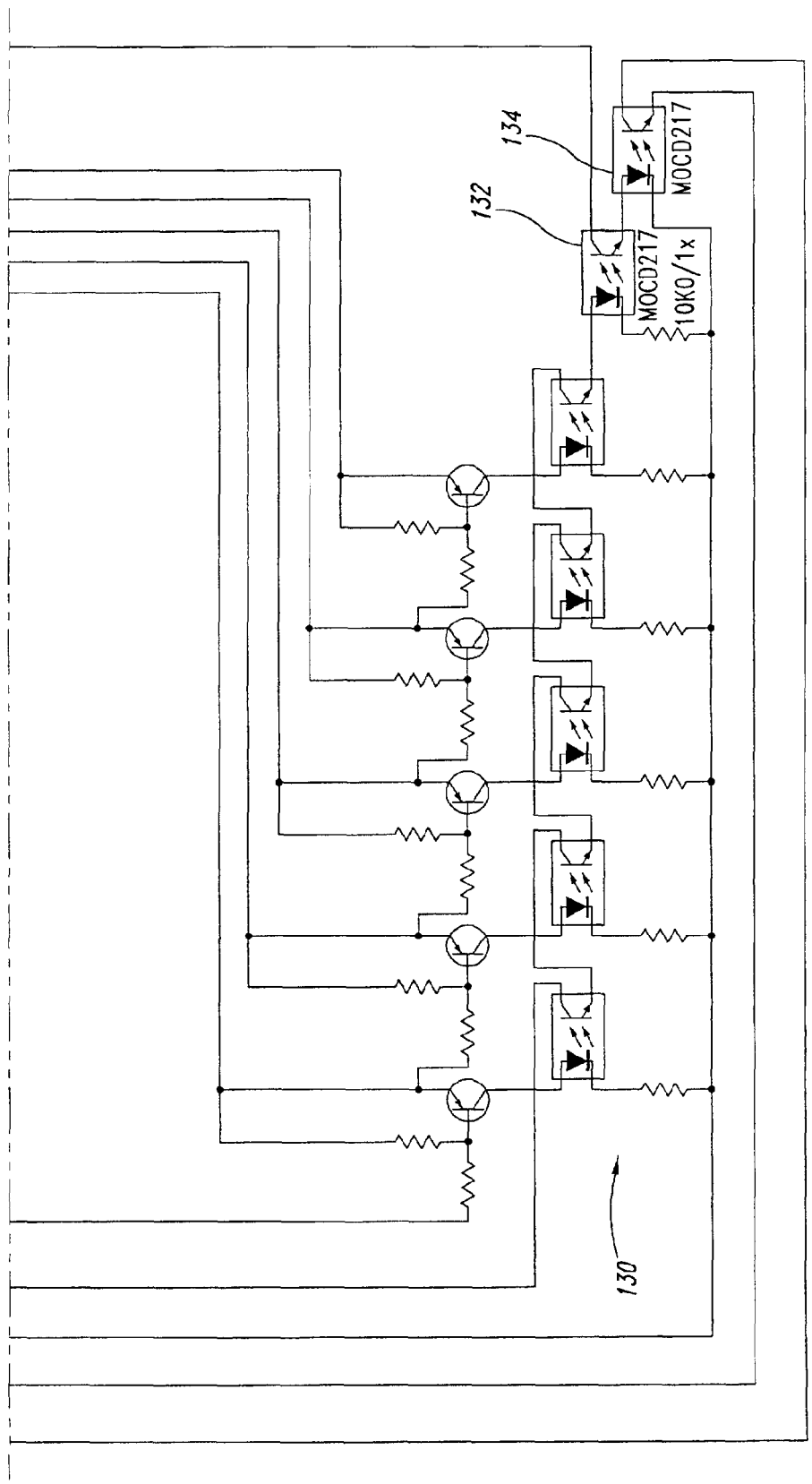

FIG. 9 shows a portion 86 of the cell voltage checker S9 for determining a voltage across a fuel cell structure 88 including at least one fuel cell assembly 16. In the illustrated embodiment, the fuel cell structure 88 is a pair of fuel cell assemblies 16. Employing a fuel cell structure 88 consisting of two fuel cell assemblies 16, optimizes the cell voltage checker S9 circuitry in terms of cost and performance. Employing a fuel cell structure 88 having a just a single fuel cell assembly requires twice as many components, while employing a fuel cell structure 88 having more than two fuel cell assemblies 16 lowers the resolution (i.e., ability to detect a minimum voltage drop) of the cell voltage checker S9. The structure shown in FIG. 9, is particularly suitable where each fuel cell assembly 16 produces a potential difference of approximately 0.6 V across the anode and cathode. The fuel cell structure 88 with two fuel cell assemblies 16 produces an approximately 1.2V total potential difference. While it is possible to monitor the voltage across groups of fuel cell assemblies 16 larger than a pair, this hinders the resolution of the monitoring circuitry, making it more difficult to detect under performing fuel cells.

The circuit portion 86 includes a transistor 90, such as a pnp bipolar junction transistor. An emitter 92 of transistor 90 is coupled to a cathode 94 of fuel cell structure 88. A base 96 of transistor 90 is coupled to an anode 98 of fuel cell structure 88 through a first resistor 100. Cathode 94 of fuel cell structure 88 is also coupled to base 96 of transistor 90 through a second resistor 102.

Use of a transistor 90 as the voltage sensing element provides an inherent advantage over other electronic components. Commercially available transistors have a trigger or threshold voltage of approximately 0.85 V. Where there is an approximately 0.6 V potential across each fuel cell assembly 16, a transistor 90 provides adequate resolution for detecting an operationally significant drop in voltage across a pair of fuel cells 88 having a total nominal potential of 1.2V. Other commercially available electronic components do not have thresholds that provide as suitable a resolution. For example, commercially available light emitting diodes ("LEDs") or optoisolators have a trigger or threshold of approximately 1.4–1.6 V. As discussed above, there are advantages in cost, structural simplicity, and monitoring effectiveness to monitoring voltage across fuel cell pairs 88 rather than across individual fuel cell assemblies 16 and/or larger groups of fuel cell assemblies 16.

The circuit portion 86 includes a digitizing circuit portion to digitize the output of transistor 90. For example, the circuit portion 86 can employ a fuel cell pair optoisolator 104 having an input terminal 106 and an output side 118 having an emitter 116 and a collector 120. The input terminal 106 of the fuel cell pair optoisolator 104 is coupled between a collector 108 of transistor 90 and a negative potential difference 110 through a third resistor 112. The negative potential difference 110 is negative with respect to a ground 114. The negative potential difference 110 should be lower than a lowest voltage of the fuel cell structure 88. Emitter 116 of the output side 118 of the fuel cell pair optoisolator 104 is coupled to ground 114. Collector 120 of the output side 118 of the fuel cell pair optoisolator 114 is coupled to a positive potential difference 122 through a fourth resistor 124. The positive potential difference 122 is set sufficiently high above the ground potential 114 so as to produce an identifiable ON signal, where the ground serves as an OFF signal. Thus, a digital signal 126 is produced on collector 120 of the fuel cell pair optoisolator 104.

The threshold voltage can be adjusted by adjusting the ratio of the first and second resistance 100, 102 attached to the base 96 of transistor 90. A suitable threshold voltage for the particular circuit arrangement is in the range of 0.7 V to 0.9 V per cell pair, and the range of 0.85 V and 0.8 V is particularly suitable.

FIGS. 10A–10H in combination show a voltage checking circuit 128 for implementing the cell voltage checker S9. (FIG. 12 is a map showing the positional relationship between FIGS. 10A–10H.) The circuit 128 includes twenty-three circuit portions 86 (FIG. 9), one for each pair of fuel cell assemblies 16 in fuel cell stack 12. The circuit 128 can employ a greater or lesser number of circuit portions 86, as governed by the number of fuel cell pairs in fuel cell stack 12

As shown in FIGS. 10A–10H, the circuit portions 86 are arranged in groups 130 corresponding to groups composed of one or more pairs of fuel cell assemblies 16. The groupings are for convenience, and thus may employ a larger or smaller number of pairs of fuel cell assemblies 16. Within each group 130, the output side 118 of the fuel cell pair optoisolators 104 are coupled in series, emitter 116 of one fuel cell pair optoisolator 104 to collector 120 of the next successive fuel cell pair optoisolator 104 in the group, thus forming a group "AND" circuit. A ground on any one of the fuel cell pair optoisolators 104 in a group 130 results in a ground output from the group 130.

Emitter 116 of the last optoisolator 104 in each group 130 is coupled to an input lead of a respective fuel cell group optoisolator 132, and the output sides 118 of the fuel cell structure optoisolators 132 are serially coupled to create a fuel cell stack "AND" circuit. The serially coupled fuel cell group optoisolators 132 "AND" the outputs of the groups 130 to produce a single output. A isolation optoisolator 134 couples the result of the fuel cell stack "AND" circuit to the microcontroller 40.

While the "AND" function or circuit can be formed with a string of optoisolators in series from each cell pair as illustrated, the "AND" function or circuit can alternatively employ multiple input "AND" gates. The illustrated design employs strings of optoisolators 104, 132 instead of discrete "AND" gates to reduce the number of parts.

Connectors 136 couple the pairs of fuel cell assembly 16 to the respective circuit portions 86. An interface 138 couples the voltage checking circuit 128 and the various other circuits to the circuit board 38 and/or microcontroller 40.

Exemplary Method of Operation

Fuel cell system 10 can employ a number of operating states that may determine which operations or tasks the microcontroller 40 executes, and may determine the response of the microcontroller 40 to various readings or measurements of fuel cell system operating parameters. The microcontroller 40 executes software that can be programmed into and executed from an on-chip flash memory of the microcontroller 40 or in other controller-readable memory. In particular, fuel cell system 10 can employ a standby state, starting state, running state, warning state, failure state, and stopping state.

In the standby state fuel cell stack 12 is not operating and the microcontroller 40 monitors a startline for a startup signal. For example, operator activation of a start button or switch (not shown) can generate the startup signal on the startup line.

In a starting state, the microcontroller 40 initializes itself, places all actuators and control devices in their proper initial states, enables a serial interface, starts a watchdog timer, and performs a series of checks to ensure that all systems and components are operational. If the outcomes of the checks are satisfactory, the microcontroller 40 causes the external load to be connected and enters a running state, otherwise fuel cell system 10 enters a failure state without becoming operational.

In a running state, fuel and oxidant are supplied to operational fuel cell stack 12. Microcontroller 40 monitors the performance of fuel cell system 10 based on the measured operating parameters, and controls the various systems via the various actuators discussed above. If microcontroller 40 determines that one or more operating parameters are outside of a warning range, microcontroller 40 places fuel cell system 10 into a warning state. Otherwise, fuel cell system 10 continues in a running state until a stop signal is received on the startup line. In response to the stop signal, microcontroller 40 advances fuel cell system 10 from a running state to a stopping state if fuel cell system 10 has been in a running state for at least one minute. If so, the microcontroller 40 begins an extended shutdown procedure lasting approximately 45 seconds, during which time the fuel cell system 12 is in a stopping state. If not, microcontroller 40 engages the normal shutdown procedure and fuel cell system 10 proceeds directly from a running state to a standby state.

In a warning state, the microcontroller 40 can provide a warning notification of the out-of-warning-range condition to the operator, but otherwise fuel cell system 10 continues to operate. Additionally, the microcontroller 40 can write a warning condition code corresponding to the out-of-warning-range condition to the persistent memory 42.

In a failure state, microcontroller 40 immediately stops operation of fuel cell system 10 and writes a fault condition code to the persistent memory 42. Fuel cell system 10 remains in a failure state until a stop signal is received on the startline. In response to the stop signal, the microcontroller 40 completes the shut down of fuel cell system 10 and places fuel cell system 10 into a standby state.

In a stopping state, the microcontroller 40 shuts down the various components of fuel cell system 10, stopping operation of fuel cell system 10. Once the various components have been shut down, the microcontroller 40 places fuel cell system 10 into a standby state.

Figure 11:
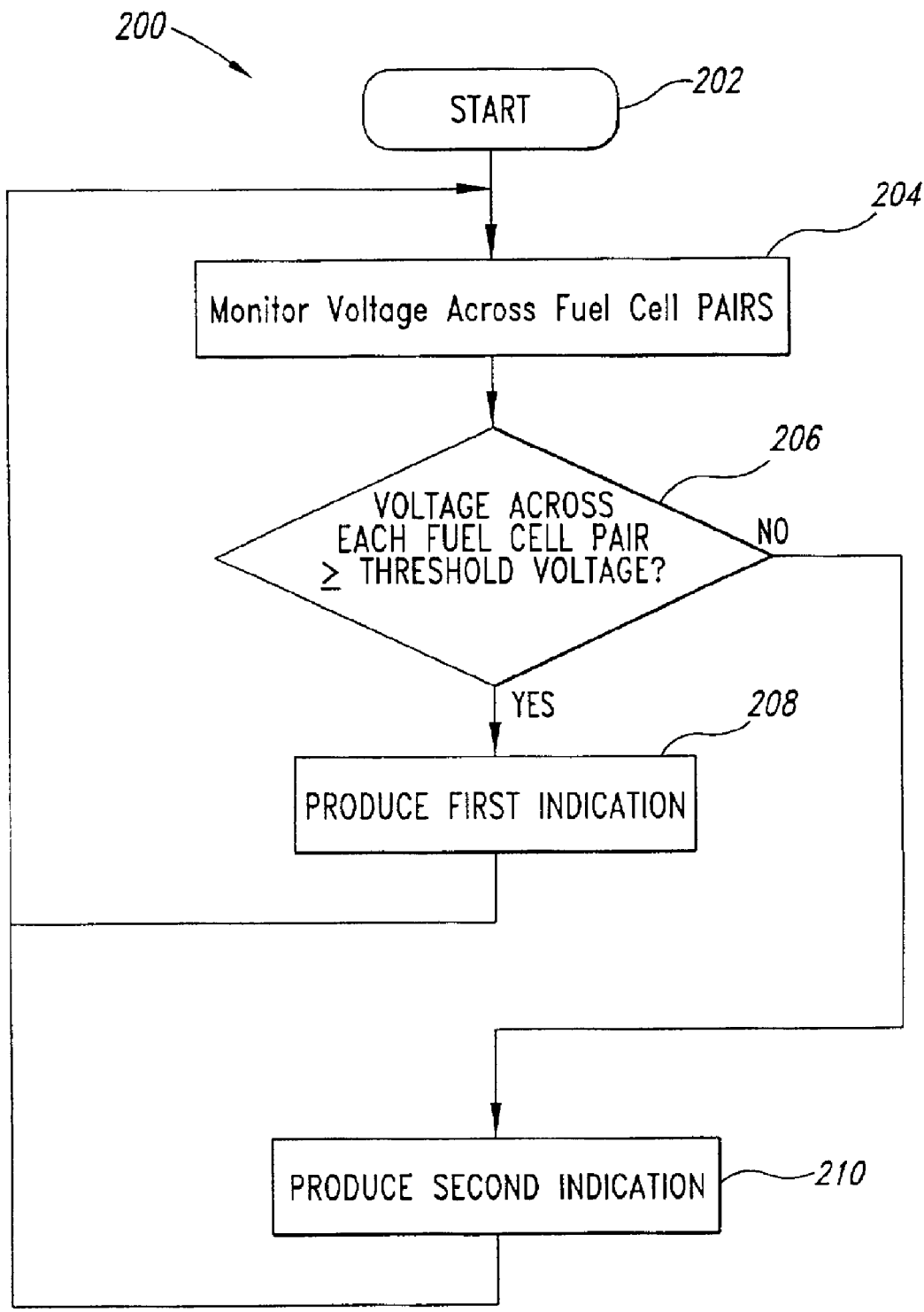
FIG. 11 is a flow diagram showing an exemplary method of operating the cell voltage checker sensor circuits of FIGS. 9 and 10A–10H.

FIG. 11 illustrates a method of operation 200 of cell voltage checker S9, starting in step 202. In step 204, the voltage checking circuit 128 monitors voltage across fuel cell pairs 88. In step 206, the voltage checking circuit 128 determines whether a voltage across each pair 88 of fuel cell assemblies 16 is greater than or equal to a threshold voltage. A suitable threshold voltage for the described embodiment is approximately 850 mV. In step 208, the voltage checking circuit 128 produces a first indication if the voltage across each of the fuel cell pairs is greater than or equal to the threshold voltage. In step 210, the voltage checking circuit 128 produces a second indication, different from the first indication, if the voltage across any of the fuel cell pairs is not greater than or equal to the threshold voltage. The voltage checking circuit 128 preferably continually monitors the voltage across the pairs 88 of fuel cell assemblies 16.

This operation can be realized through the various electrical and electronics depicted in FIGS. 9 and 10A–H. For example, a number of the circuit portions 86 (FIG. 9) are strung together (FIGS. 10A–10H) to generate a signal indicating when at least one of the fuel cell pairs 88 suffers a voltage drop greater than a threshold voltage level. The voltage checking circuit 128 employs the voltage drop across the base-emitter junction of a pnp transistor 90 as a threshold detection. The voltage required to force the p-n junction on the pnp transistor 90 to conduct is approximately 0.6 V. The cell voltage checker S9 takes advantage of this inherent characteristic by employing selected resistances to set a suitable threshold voltage (e.g., 0.85V) while reducing the number of parts in the voltage checking circuit 128 and maintaining sufficient resolution to detect a failure of any single fuel cell 16.

The pnp transistors 90 connect across respective pairs of fuel cell assemblies 16 in fuel cell stack 12 (FIG. 1). When the voltage across the base-emitter junction of the pnp transistors 90 exceeds the value at which transistor 90 conducts, the fuel cell pair optoisolator 104 is turned ON. The fuel cell pair optoisolator 104 remains OFF when the voltage across the base-emitter junction does not exceed the value at which transistor 90 conducts. Thus, circuit portion 86 produces a digital output (i.e., +5V or 0V) on the digital signal line 126. The "AND" function or circuit produces a single value indicating if any of the fuel cell pairs 88 is below the voltage threshold, thus forming an alarm circuit.

Although specific embodiments, and examples for, the invention are described herein for illustrative purposes, various equivalent modifications can be made without departing from the spirit and scope of the invention, as will be recognized by those skilled in the relevant art. The teachings provided herein of the invention can be applied to other fuel cell systems, not necessarily the PME fuel cell system described above.

Commonly assigned U.S. patent applications Ser. No. 09/916,241, entitled FUEL CELL AMBIENT ENVIRONMENT MONITORING AND CONTROL APPARATUS AND METHOD, now U.S. Pat. No. 6,815,101; Ser. No. 09/916,117, entitled FUEL CELL CONTROLLER SELF INSPECTION; Ser. No. 09/916,211, entitled FUEL CELL PURGING METHOD AND APPARATUS; Ser. No. 09/916,213, entitled FUEL CELL RESUSCITATION METHOD AND APPARATUS; Ser. No. 09/916,240, entitled FUEL CELL SYSTEM METHOD, APPARATUS AND SCHEDULING; Ser. No. 09/916,239, entitled FUEL CELL SYSTEM AUTOMATIC POWER SWITCHING METHOD AND APPARATUS; Ser. No. 09/916,118, entitled PRODUCT WATER PUMP FOR FUEL CELL SYSTEM, now abandoned; and Ser. No. 09/916,212, entitled FUEL CELL SYSTEM HAVING A HYDROGEN SENSOR, all filed Jul. 25, 2001, are incorporated herein by reference, in their entirety.

The various embodiments described above and in the applications and patents incorporated herein by reference can be combined to provide further embodiments. The described methods can omit some acts and can add other acts, and can execute the acts in a different order than that illustrated, to achieve the advantages of the invention.

These and other changes can be made to the invention in light of the above detailed description. In general, in the following claims, the terms used should not be construed to limit the invention to the specific embodiments disclosed in the specification, but should be construed to include all fuel cell systems, controllers and processors, actuators, and sensors that operate in accordance with the claims. Accordingly, the invention is not limited by the disclosure, but instead its scope is to be determined entirely by the following claims.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A fuel cell system, comprising:
   a fuel cell structure comprising at least one fuel cell;
   at least one pnp bipolar junction transistor having a base, an emitter and a collector, the transistor coupled to respond to a voltage across the fuel cell structure;
   an alarm circuit coupled to the collector of the transistor; and
   an optoisolator having a first terminal, a second terminal and a switching terminal, the first terminal of the optoisolator coupled to a ground, the second terminal coupled to a positive reference voltage source that is positive with respect to the ground, the switching terminal of the optoisolator coupled between the collector of the transistor and a negative reference voltage source that has a voltage that is less than a lowest voltage of the fuel cell structure.

2. The fuel cell system of claim 1, further comprising:
a first base resistance coupled between the fuel cell structure and the base of the transistor; and
a second base resistance coupled between the fuel cell structure and the base of the transistor.

3. The fuel cell system of claim 1, further comprising:
a first optoisolator resistance coupled between the switching terminal of the optoisolator and a negative reference voltage supply; and
a second optoisolator resistance coupled between the second terminal of the optoisolator and a positive reference voltage supply.

4. The fuel cell system of claim 1 wherein the fuel cell structure includes a plurality of fuel cells electrically connected to one another in series.

5. A fuel cell system, comprising:
a pair of solid polymer fuel cells electrically connected to one another in series;
at least one pnp bipolar junction transistor having a base, an emitter and a collector, the transistor coupled to respond to a voltage across only the pair of solid polymer fuel cells; and
an alarm circuit coupled to the collector of the transistor.

6. A fuel cell system, comprising:
a fuel cell stack comprising at least two fuel cell structures, each fuel cell structure comprising a pair of fuel cells;
for each fuel cell structure, a respective pnp bipolar junction transistor, comprising a base, an emitter and a collector, and coupled to respond to a voltage across the fuel cell structure, and
for each fuel cell structure, a fuel cell pair optoisolator having an output including a first terminal, a second terminal, and an input including a switching terminal, the first terminal coupled to a ground, the second terminal coupled to a positive reference voltage that is positive with respect to the ground, and the switching terminal coupled between the collector of the transistor and a negative reference voltage that has a voltage less than a lowest voltage of the respective fuel cell structure.

7. The fuel cell system of claim 6, further comprising:
for each of the fuel cell structures, a fuel cell structure AND circuit, ANDING the outputs of each of the fuel cell pair optoisolators of the respective fuel cell structures.

8. The fuel cell system of claim 6, further comprising:
for each fuel cell structure, a respective fuel cell structure optoisolator having an output including a first terminal and a second terminal and an input including a switching terminal, wherein for each fuel cell structure, the outputs of each of the fuel cell pair optoisolators are coupled in series to one another and are coupled to the negative reference voltage through the switching terminal of the respective fuel cell structure optoisolator, the outputs of the respective fuel cell structure optoisolators being coupled in series with one another.

9. The fuel cell system of claim 6, further comprising:
for each of the fuel cell structures, a fuel cell structure AND circuit ANDING the outputs of each of the fuel cell pair optoisolators of the respective fuel cell structures; and
a fuel cell stack AND circuit, ANDING each of the outputs of the respective fuel cell structure AND circuits.

10. The fuel cell system of claim 6, further comprising:
for each fuel cell structure, a respective fuel cell structure optoisolator having an output including a first terminal and a second terminal and an input including a switching terminal, wherein for each fuel cell structure, the outputs of each of the fuel cell pair optoisolators are coupled in series to one another and are coupled to the negative reference voltage through the switching terminal of the respective fuel cell structure optoisolator, the outputs of the respective fuel cell structure optoisolators being coupled in series with one another; and
a fuel cell stack optoisolator having an output including a first terminal and a second terminal and an input including a switching terminal, the second terminal of a final one of the fuel cell structure optoisolators coupled to the negative reference voltage through the switching terminal of the fuel cell stack optoisolator.

11. A monitoring system for monitoring fuel cells, comprising:
a transistor having a first terminal, a second terminal, and a switching terminal, the first terminal and the switching terminal of the transistor couplable to respond to a voltage across at least two fuel cells; and
an optoisolator having a first terminal, a second terminal and a switching terminal, the first terminal of the optoisolator coupled to a ground reference voltage, the switching terminal coupled between the second terminal of the transistor and a first reference voltage below the ground reference voltage for control by the transistor in response to the voltage across the fuel cells, the second terminal of the optoisolator coupled to a second reference voltage above the ground reference voltage to produce a digital signal on the second terminal corresponding to an operational status of the fuel cells.

12. The monitoring system of claim 11 wherein the transistor is a pnp bipolar junction transistor, the first terminal forming an emitter, the second terminal forming a collector, and the switching terminal forming a base of the pnp transistor.

13. The monitoring system of claim 11 wherein the transistor is couplable to a pair of fuel cells to respond to the voltage across the two fuel cells.

14. The monitoring system of claim 11, further comprising:
a connector including a first lead coupled to the first terminal of the transistor to couplable the first terminal of the transistor to one of the fuel cells, and a second lead coupled to the switching terminal of the transistor to couple the switching terminal to another of the fuel cells.

15. A monitoring system for monitoring fuel cells, comprising:
a set of digitizing switches, each of the digitizing switches having a first terminal coupled to a ground, a second terminal coupled to a positive reference voltage with respect to the ground, and a switching terminal coupled to a negative reference voltage with respect to ground, each of the digitizing switches responsive to a first defined potential difference between the first terminal and the switching terminal of the respective digitizing switch; and
a set of triggering switches, each of the triggering switches having a first terminal and a switching terminal couplable across a respective one of a number of fuel cell structures, and a second terminal coupled to the switching terminal of a respective one of the digitizing switches, each of the triggering switches responsive to a second defined potential difference between the first terminal and the switching terminal of the triggering switch.

16. The monitoring system of claim 15 wherein the set of digitizing switches comprises a number of optoisolators.

17. The monitoring system of claim 15 wherein the set of triggering switches comprises a number of pnp bipolar junction transistors, the first terminal forming an emitter, the second terminal forming a collector and the switching terminal forming a base of the respective pnp bipolar junction transistor.

18. The monitoring system of claim 15 wherein the first switch comprises a bipolar junction transistor and the second defined potential difference is approximately 0.6 volts.

19. The monitoring system of claim 15, further comprising:
a connector having a first set of leads coupled to respective ones of the first terminals of the triggering switches and a second set of leads coupled to respective ones of the switching terminals of the triggering switches.

20. The monitoring system of claim 15 wherein there is one triggering switch for each pair of fuel cells in the fuel cell structure.

21. The monitoring system of claim 15 wherein a number of the digitizing switches are coupled in series to provide a single digital signal.

22. The monitoring system of claim 15 wherein a number of subsets of the digitizing switches are coupled in series to provide a single digital signal for each subset, and further comprising:
an number of AND circuits coupling the digital signals from the subsets of the digitizing switches to provide a single digital signal for the set of digitizing switches.

23. A method of monitoring fuel cells in a fuel cell structure, comprising:
coupling a first terminal and a switching terminal of a transistor across a pair of fuel cells electrically connected in series forming a fuel cell structure;
producing a first indication when the voltage across the fuel cell structure is greater than a predetermined threshold voltage; and
producing a second indication, different from the first indication, when the voltage across the fuel cell structure is not greater than the threshold voltage.

24. A method of monitoring fuel cells in a fuel cell structure, comprising:
coupling a first terminal and a switching terminal of a transistor across a pair of fuel cells electrically connected in series forming a fuel cell structure;
producing a first indication when the voltage across the fuel cell structure is greater than a threshold voltage;
producing a second indication, different from the first indication, when the voltage across the fuel cell structure is not greater than the threshold voltage;
coupling a second terminal of the transistor to an optoisolator; and
activating the optoisolator when current is passing between the first and the second terminals of the transistor and deactivating the optoisolator when current is not passing between the first and the second terminals of the transistor.

25. The method of claim 23 wherein coupling a first terminal and a switching terminal of a transistor across a pair of fuel cells forming a fuel cell structure, includes:
coupling the first terminal to a cathode of one of the fuel cells of the fuel cell structure and coupling the switching terminal to the anode of the other fuel cell of the fuel cell structure.

26. The method of claim 23 wherein coupling a first terminal and a switching terminal of a transistor across a pair of fuel cells forming a fuel cell structure, includes:
coupling the first terminal to a cathode of one of the fuel cells in the fuel cell structure and coupling the switching terminal to an anode of the other fuel cell of the fuel cell structure through a first resistor and to the cathode of the fuel cell structure through a second resistor.

27. The method of claim 23 wherein coupling a first terminal and a switching terminal of a transistor across a pair of fuel cells forming a fuel cell structure, includes:
coupling the first terminal to a cathode of the first of the fuel cells in the fuel cell structure and coupling the switching terminal to an anode of the second fuel cell of the fuel cell structure through a first resistor and to the cathode of the first fuel cell through a second resistor;
selecting a first resistance of the first resistor and a second resistance of the second resistor to set the threshold voltage to a voltage in a range of 0.8 volts to 0.85 volts.

28. The method of claim 23 wherein producing a first indication when the voltage across the fuel cell structure is greater than a threshold voltage includes producing a first voltage level corresponding to one of an ON and an OFF indication and wherein producing a second indication, different from the first indication, when the voltage of the fuel cell structure is not greater than the threshold voltage includes producing a second voltage level corresponding to the other of the ON and the OFF indication.

29. A method of monitoring fuel cells in a fuel cell stack, comprising:
monitoring a voltage across a first set of at least two fuel cells in the fuel cell stack with at least a first transistor electrically coupled across the first set of at least two fuel cells;
simultaneously monitoring a voltage across a second set of at least two fuel cells in the fuel cell stack with at least a second transistor electrically coupled across the second set of at least two fuel cells;
producing a first indication when the voltage across each of the first and the second sets of at least two fuel cells in the fuel cell stack is greater than a threshold voltage; and
producing a second indication when the voltage across any of the first and the second sets of at least two fuel cells in the fuel cell stack is not greater than the threshold voltage.

30. The method of claim 29 wherein monitoring a voltage across a first set of at least two fuel cells includes detecting a current flow from the first transistor, the first transistor having a first terminal and a switching terminal coupled to the first set of at least two fuel cells; and wherein simultaneously monitoring a voltage across a second set of at least two fuel cells includes detecting a current flow from the second transistor, the second transistor having a first terminal and a switching terminal coupled to the second set of at least two fuel cells.

31. A method of monitoring fuel cells in a fuel cell stack, comprising:
monitoring a voltage across a first set of at least two fuel cells in the fuel cell stack with at least a first transistor and a first optoisolator;

simultaneously monitoring a voltage across a second set of at least two fuel cells in the fuel cell stack with at least a second transistor and a second optoisolator;

producing a first indication when the voltage across each of the first and the second sets of at least two fuel cells in the fuel cell stack is greater than a threshold voltage; and producing a second indication when the voltage across any of the first and the second sets of at least two fuel cells in the fuel cell stack is not greater than the threshold voltage.

32. The method of claim 31 wherein monitoring a voltage across a first set of at least two fuel cells includes detecting a current flow from an output side of the first optoisolator, the first transistor having a first terminal and a switching terminal coupled to the first set of at least two fuel cells, and a second terminal coupled to an input side of the first optoisolator; and wherein simultaneously monitoring a voltage across a second set of at least two fuel cells includes detecting a current flow from an output side of the second optoisolator, the second transistor having a first terminal and a switching terminal coupled to the second set of at least two fuel cells, and a second terminal coupled to an input side of the second optoisolator.

* * * * *

UNITED STATES PATENT AND TRADEMARK OFFICE
CERTIFICATE OF CORRECTION

PATENT NO. : 6,953,630 B2
DATED : October 11, 2005
INVENTOR(S) : Brian Wells

It is certified that error appears in the above-identified patent and that said Letters Patent is hereby corrected as shown below:

Title page,
Item [56], References Cited, FOREIGN PATENT DOCUMENTS,
"EP          1091436 A1          12/2000" should read
-- EP        1091436 A1          4/2001 --.
OTHER PUBLICATIONS,
"Abstract of JP 4-220955, *esp@cenet* database, Apr. 11, 1992" should read
-- Abstract of JP 4-220955, *esp@cenet* database, Aug. 11, 1992 --.

Signed and Sealed this

Seventeenth Day of January, 2006

JON W. DUDAS
*Director of the United States Patent and Trademark Office*